(12) United States Patent
Adams et al.

(10) Patent No.: US 11,799,658 B2
(45) Date of Patent: Oct. 24, 2023

(54) TRACKING DATA THROUGHOUT AN ASSET LIFECYCLE

(71) Applicant: Bank of America Corporation, Charlotte, NC (US)

(72) Inventors: Amanda Jane Adams, Flint (GB); Beverley Claire Morgan, Wrexham (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/082,719

(22) Filed: Oct. 28, 2020

(65) Prior Publication Data
US 2022/0131702 A1    Apr. 28, 2022

(51) Int. Cl.
*H04L 9/32*    (2006.01)
*G06F 11/30*    (2006.01)
*G06F 11/34*    (2006.01)
*H04L 67/50*    (2022.01)

(52) U.S. Cl.
CPC ........ *H04L 9/3236* (2013.01); *G06F 11/3006* (2013.01); *G06F 11/3476* (2013.01); *H04L 67/535* (2022.05)

(58) Field of Classification Search
None
See application file for complete search history.

(56) References Cited

U.S. PATENT DOCUMENTS

| | | |
|---|---|---|
| 7,680,830 B1 | 3/2010 | Ohr et al. |
| 8,386,418 B2 | 2/2013 | Birch et al. |
| 8,812,436 B2 | 8/2014 | Thiam |
| 9,454,324 B1 | 9/2016 | Madhavapeddi |
| 9,769,153 B1* | 9/2017 | Bowen ............... H04L 63/0823 |
| 11,227,064 B1* | 1/2022 | Fakhraie ................. H04L 63/10 |
| 2007/0118758 A1* | 5/2007 | Takahashi ............. G06F 21/305 |
| | | 713/186 |
| 2014/0330749 A1 | 11/2014 | Candas et al. |
| 2015/0262224 A1* | 9/2015 | Brown ................ G06F 11/3051 |
| | | 705/14.45 |
| 2017/0053131 A1 | 2/2017 | Modi et al. |
| 2020/0193429 A1* | 6/2020 | Babar ................... H04L 9/0637 |

* cited by examiner

*Primary Examiner* — Anh Nguyen
(74) *Attorney, Agent, or Firm* — Banner & Witcoff, Ltd.

(57) ABSTRACT

Aspects of the disclosure relate to enhanced tracking of data over an asset lifecycle. A computing platform may receive, via the communication interface, user account information as part of an onboarding process in which a first user account is created. The computing platform may then compute, using a cryptographic hash function, a first hash value associated with the first user account, wherein the first hash value provides a trackable, immutable code corresponding to the first user account. Thereafter, the computing platform may monitor one or more events in a transaction activity pool. Upon detecting a new activity associated with the first user account in the transaction activity pool, the computing platform may append the new activity to a record in a trackable log linked to the first hash value.

18 Claims, 12 Drawing Sheets

TRACKING DATA THROUGHOUT AN ASSET LIFECYCLE

BACKGROUND

Aspects of the disclosure relate to management and review of asset data. In particular, one or more aspects of the disclosure relate to computing platforms that provide enhanced tracking throughout an event processing lifecycle.

In some cases, enterprise organizations may use different systems to manage data throughout an asset lifecycle. For example, each of the different systems may be responsible for performing a unique task or set of tasks that, once completed by each system, may result in asset data being present in one or more locations. In some instances, however, data related to an asset may be present in a number of locations without a clear record of the data over the asset lifecycle. Accordingly, enterprise organizations and/or other individuals may experience difficulties trying to track and manage data across the different systems and throughout an asset lifecycle.

SUMMARY

Aspects of the disclosure provide effective, efficient, scalable, and convenient technical solutions that address and overcome the technical problems associated with tracking of processed events. In accordance with one or more embodiments of the disclosure, a computing platform comprising at least one processor, a communication interface, and memory storing computer-readable instructions may receive, via the communication interface, user account information as part of an onboarding process in which a first user account is created. The computing platform may then compute, using a cryptographic hash function, a first hash value associated with the first user account. The first hash value may provide a trackable, immutable code corresponding to the first user account. Thereafter, the computing platform may monitor one or more events in a transaction activity pool. The computing platform may detect a new activity associated with the first user account in the transaction activity pool. Upon detecting new activity associated with the first user account, the computing platform may append the new activity to a record in a trackable log linked to the first hash value.

In one or more instances, the computing platform may receive a request to access one or more records in the trackable log. In these instances, the computing platform may thereafter generate an asset lifecycle interface and one or more commands directing an enterprise computing device to display the asset lifecycle interface. Subsequently, the computing platform may send, to the enterprise computing device, the asset lifecycle interface and the one or more commands directing the enterprise computing device to display the asset lifecycle interface. Receiving the request to access one or more records in the trackable log may include receiving a request, from the enterprise computing device to access the one or more user accounts, and identifying one or more hash values corresponding to the one or more user accounts.

In one or more instances, receiving user account information as part of the onboarding process may include monitoring the transaction activity pool, and detecting an indication of the onboarding process in the transaction activity pool.

In one or more instances, computing the first hash value may include verifying that there is no existing hash value matching the first hash value. Additionally, in these instances, the computing platform may append an onboard activity data entry to the record in the trackable log linked to the existing hash value, upon determining that there is an existing hash value matching the first hash value.

In one or more instances, computing the first hash value may include storing the first hash value and an onboard activity data entry to the record in the trackable log. In some instances, monitoring the transaction activity pool may include receiving a notification of a user account activity upon a user computing device transmitting instructions to an enterprise computing device to perform the user account activity. Still in some instances, monitoring the transaction activity pool includes receiving an indication that an enterprise computing device has decrypted enterprise data corresponding to the first user account.

In one or more instances, detecting the new activity associated with the first user account in the transaction activity pool may include computing one or more hash values from account information associated with the one or more events in the transaction activity pool, and comparing the one or more hash values to the first hash value. In these instances, the new activity may be appended to the record in the trackable log linked to the first hash value upon determining a match between the one of the one or more hash values and the first hash value. Additionally, in these instances, the computing platform may compare one of the one or more hash values to one or more stored hash values in the trackable log. Upon determining that there is no match between the one of the one or more hash values and the one or more stored hash values, the computing platform may add a new record in the trackable log. The new record may include the one of the one or more hash values.

In one or more instances, the computing platform may determine if the new activity is indicative of a data change. In these instances, appending the new activity to the record in the trackable log may include appending the new activity to the record in the trackable log linked to the first hash value upon determining that the new activity is not indicative of a data change. Additionally, in these instances, upon determining that the new activity is indicative of a data change, the computing platform may compute, using the cryptographic hash function, a second hash value associated with the new activity, and add second record in the trackable log. The second record may include the second hash value, the first hash value, and the new activity.

In one or more instances, the computing platform may receive, via the communication interface, a notification as part of an account termination process in which the first user account is terminated, determine, based on the record in the trackable log, one or more computing locations of account data linked to the first user account, and transmit instructions to scrub account data from the one or more computing locations. In these instances, receiving the notification as part of the account termination process may include monitoring the activity transaction pool for a notification of account termination activity. Additionally, in these instances, the computing platform may append account termination activity to the record in the trackable log linked to the first hash value.

In accordance with one or more embodiments, a method is provided at a computing platform comprising at least one processor, a communication interface, and memory. The method may include receiving, via the communication interface, user account information as part of an onboarding process in which a first user account is created, computing, using a cryptographic hash function, a first hash value associated with the first user account, wherein the first hash value provides a trackable, immutable code corresponding to the first user account, monitoring one or more events in a transaction activity pool, detecting a new activity associated with the first user account in the transaction activity pool, and upon detecting the new activity associated with the first user account, appending the new activity to a record in a trackable log linked to the first hash value.

In one or more instances, the method may include receiving a request to access one or more records in the trackable log, generating an asset lifecycle interface and one or more commands directing an enterprise computing device to display the asset lifecycle interface, and sending, to the enterprise computing device, the asset lifecycle interface and the one or more commands directing the enterprise computing device to display the asset lifecycle interface.

In one or more instances, the method may include computing one or more hash values from account information associated with the one or more events in the transaction activity pool, and comparing the one or more hash values to the first hash value. In these instances, the new activity may be appended to the record in the trackable log linked to the first hash value upon determining a match between the one of the one or more hash values and the first hash value.

In one or more instances, the method may include receiving, via the communication interface, a notification as part of an account termination process in which the first user account is terminated, determining, based on the record in the trackable log, one or more computing locations of account data linked to the first user account, and transmitting instructions to scrub account data from the one or more computing locations.

In accordance with one or more embodiments, one or more non-transitory computer-readable media may be provided storing instructions that, when executed by a computing platform comprising at least one processor, a communication interface, and memory cause the computing platform to receive, via the communication interface, user account information as part of an onboarding process in which a first user account is created, compute, using a cryptographic hash function, a first hash value associated with the first user account, wherein the first hash value provides a trackable, immutable code corresponding to the first user account, monitor one or more events in a transaction activity pool, detect a new activity associated with the first user account in the transaction activity pool, and upon detecting the new activity associated with the first user account, append the new activity to a record in a trackable log linked to the first hash value.

In one or more instances, the instructions, when executed by the computing platform, may cause the computing platform to receive, from a developer computing platform, a test execution request, the test execution request including a test code for execution, establish a secure connection to an enterprise data storage database, upon establishing the secure connection, request confidential data from the enterprise data storage database in connection the test execution request, execute the test code, wherein executing the test code includes: receiving encrypted confidential data from the enterprise data storage, decrypting the confidential data, and plugging the confidential data into the test code, upon completing execution of the test code, delete the confidential data from the computing platform, and send, via the communication interface, to the developer computing platform, test code output results.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
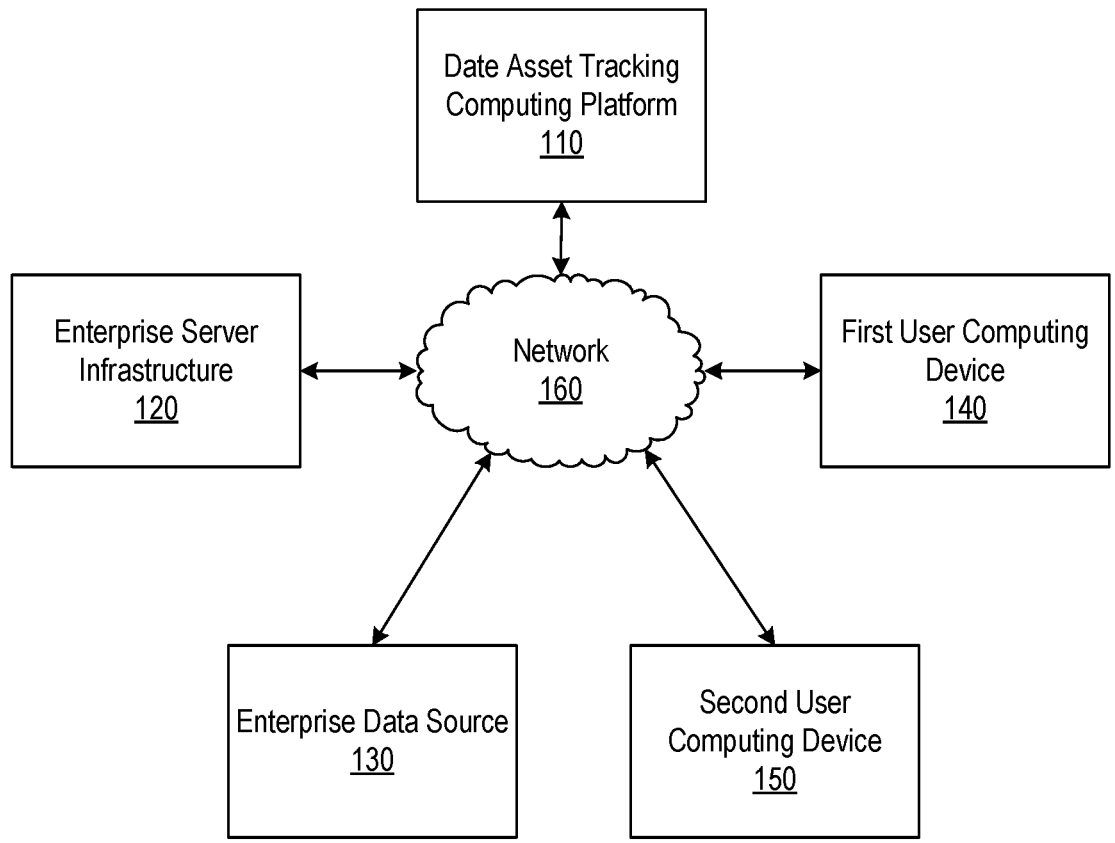
FIGS. 1A-1B depict an illustrative computing environment for implementing in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe systems and methods for data tracking throughout an asset lifecycle. During the course of an asset lifecycle, data related to the asset may be present in a number of various locations. In some instances, such data and activities related to the data may be difficult to track efficiently and effectively. For example, where a user or customer, such as a credit or debit card user, signs up for a financial service, data related to that service may be sent to a number of locations in the course of carrying out specified financial activities during the course of the asset lifecycle. In some instances, compliance with regulatory requirements may entail removing all data instances at specified times. Compliance may be difficult where accurate and reliable tracking of the data is unavailable without the potential disclosure of confidential information.

Accordingly, one or more of the systems and methods described herein provide technical solutions to address one or more of these technical deficiencies. To do so, the aspects described herein implement computation of unique hash values to an asset and tracking activities in a trackable log tied to the unique hash values over the lifecycle of an asset. For example, when a new user signs up for an asset service, that service may be assigned with a unique reference number or reference code (also referred to herein as a hash value), e.g., in addition to an application number and an account number. The unique reference number or hash value may then be used to track activity related to the account throughout the asset lifecycle, e.g., from opening an account through to closing the account. In that regard, whenever activity related to the account occurs, e.g., processing data or sending data to a print application, such activity may be saved to an immutable record in a trackable log (e.g., a blockchain or a distributed ledger). Such a trackable log may provide information relating to all activities that take place during the lifecycle of an asset. The trackable log may be used to create reports and analyses relating to activities and other metrics over the course of an asset lifecycle, e.g., specific to a particular account or particular user or based on aggregating a number of accounts or number of users. As the record in the trackable log may be immutable, the log may be locked from user editing and thus may provide a reliable record of the data over the lifecycle of the asset.

When an asset is to be closed, all data related to the asset may be removed, using information provided in the trackable log to identify all instances of the data. In that regard, the trackable log may provide a list of all data locations related to the asset and such list may facilitate in ensuring that all data related to the asset is deleted and scrubbed when desired to do so. The unique reference number or hash value may, in some instances, tie one user to multiple accounts or assets, such that all assets related to a particular user may be tracked in a single record. In some instances, an enterprise organization may run the unique hash value through the immutable log to provide information relating to where all data relating to that asset has gone. For example, the immutable log may provide that the data was printed on a specific date at a specific place, that an address change or name change occurred on a specific date, that data was masked at a specific location, and the like. The immutable log may be automatically updated as activities related to the asset occur. As such the immutable log may build up an account of the asset over its lifecycle and describe all places in which asset data was present. In some instances, compliance with regulatory requirements may entail removing all data instances at specified times. The immutable log may facilitate with the compliance of such requirements by providing a thorough and accurate record of all instances of the asset data.

More specifically, a one-way hash value may be computed using a cryptographic hash function on information associated with an asset, e.g., user account information. Information detailing activities on the asset may be tracked in a record tied to the hash value (rather than the user account number or other conventional user-identifying data) in an immutable log. When asset data is touched for any reason, e.g., moved, sanitized, printed, such activity may be recorded in the immutable log, e.g., a blockchain or a distributed ledger. Thus, information over the lifecycle of an asset may be thoroughly and reliably tracked without potentially compromising confidential user information. This may serve regulatory reporting needs and/or internal analytical needs.

In doing so, three phases may be considered: creating hash values for customers or users, tracking asset data activities, and the searching, tracking, and removal of records in the trackable log.

Creating hash values may include identifying all fields that will be considered for computing the hash value or retaining in the record with the hash value. Such fields may include user name, address, date of birth, location, security questions, social security number, and the like. In some examples, hash values may be created both for account holders and for account applicants, e.g., who do not actually become account holders but the enterprise organization still has related data. In some examples, initiation of an onboarding event at the enterprise organization, e.g., to open a new account, may initiate the computation of a new hash value. The onboarding event may include identifying fields for computing the hash value and gathering the data to populate such fields.

Tracking asset data activities may include appending activity entries to an immutable log in connection with a hash value. Asset data activities may include events such as onboarding, storage, distribution, processing, alteration, removal, revocation, success or failure in an application or service, and the like. Such events may be detected by monitoring a transaction activity pool where a descriptor of asset data is being accessed and/or decrypted is output to the transaction activity pool. The transaction activity pool may thus provide a log of information relevant for tracking asset data activities in the immutable log. Activities in the transaction activity pool may be recorded and appended to the immutable log as an activity entry.

Searching, tracking, and appending of records in the trackable log may be performed, e.g., for compliance with regulatory requirements. For example, where regulatory requirement specific for all asset data to be removed upon certain conditions, the immutable log may be used to identify all instances of the asset data for the subsequent removal and/or revocation of such data. The immutable log may also be used to track data in the event of a system compromise, e.g., if a vendor has been breached. The immutable log may thus ensure that all instances of the asset data is accurately and reliably tracked and thus able to be removed when needed. The immutable log may also provide information for the enterprise organization to build statistics and understand a customer journey over the lifecycle of an asset.

In addition, one or more of the systems and methods described herein may result in benefits related to operational efficiency. For example, researching full trails of an asset lifecycle may involve having a way to look up the full lifecycle details based on a single identifier, such as the hash value. Furthermore, one or more of the systems and methods described herein may result in regulatory benefits. For example, regulatory requirements may require the tracking and management of all data that is correlated across multiple systems, and thus may be made more efficient through the trackable log described herein. As yet an additional benefit, one or more of the systems and methods described herein may provide the ability to view end to end flows of an asset and thus may provide additional insights into the asset lifecycle. In addition, one or more of the systems and methods described herein may result in data statistical benefits. For example, implementing the immutable log described herein may provide a realistic view of asset activity that may be dynamically generated at any given point in time during and after a lifecycle of an as set.

Figure 1B:
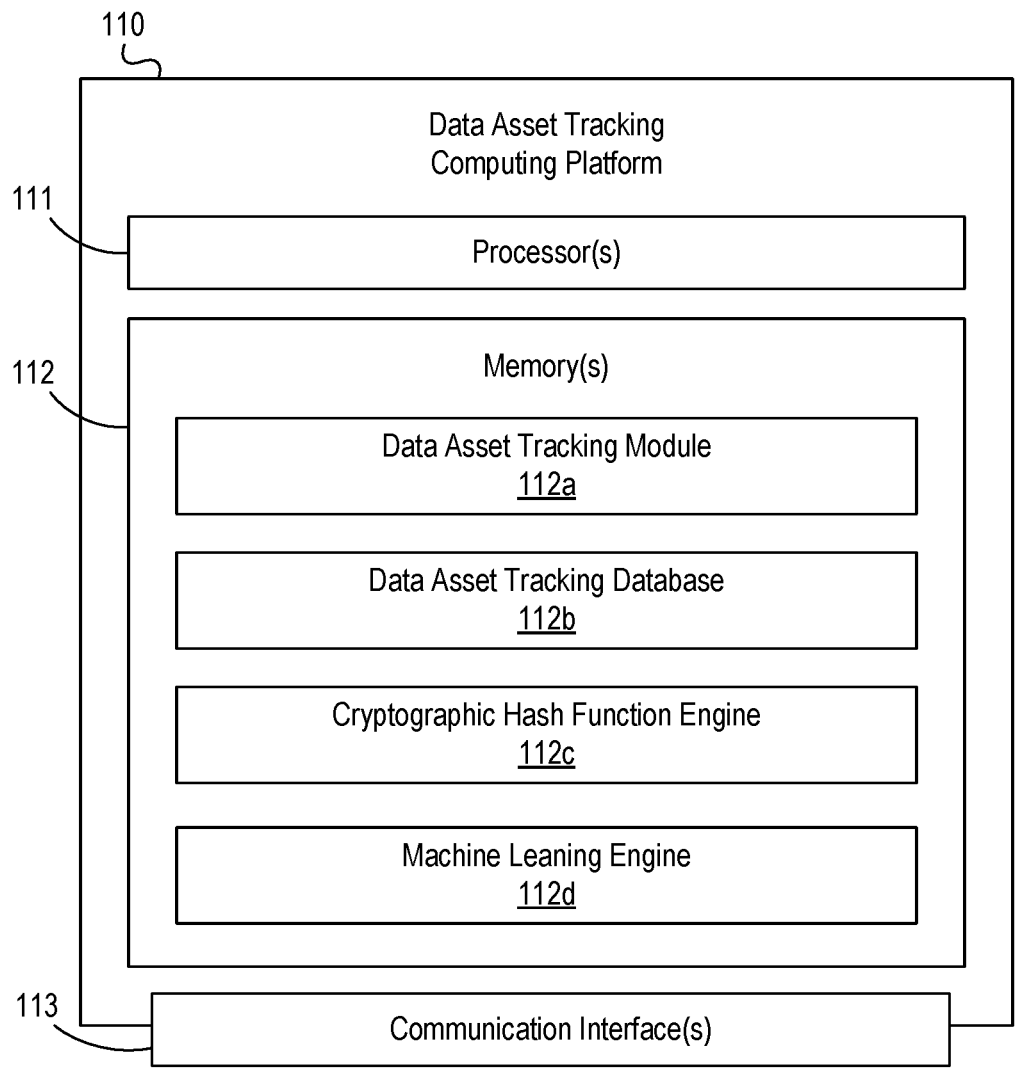

FIGS. 1A-1B depict an illustrative computing environment that implements data tracking throughout an asset cycle in accordance with one or more example embodiments. Referring to FIG. 1A, computing environment 100 may include one or more computer systems. For example, computing environment 100 may include a data asset tracking computing platform 110, an enterprise server infrastructure, an enterprise data source 130, a first user computing device 140, and a second user computing device 150.

As described further below, data asset tracking computing platform 110 may include a computer system that includes one or more computing devices (e.g., servers, server blades, or the like) and/or other computer components (e.g., processors, memories, communication interfaces) that may be used to host and maintain an immutable log that links asset data by a hash value between various systems across an enterprise organization. In some instances, the immutable log hosted and maintain by the data asset tracking computing platform 110 to identify all systems involved in instances of asset data associated with a hash value, and subsequently to communicate with the identified systems for additional processing specific to the hash value.

Data asset tracking computing platform 110 may include one or more computing devices configured to perform one or more of the functions described herein. For example, data asset tracking computing platform 110 may include one or more computers (e.g., laptop computers, desktop computers, servers, server blades, or the like) configured to perform one or more of the functions described herein, as discussed in greater detail below. Data asset tracking computing platform 110 may be configured to host and/or execute a machine learning engine to provide data asset tracking. In some examples, data asset tracking computing platform 110 may be connected to one or more enterprise computing platforms or devices to receive user account information and track one or more user account activities.

Data asset tracking computing platform 110 may include distinct and physically separate data centers or other groupings of server computers that are operated by and/or otherwise associated with an organization, such as a financial institution. In addition, data asset tracking computing platform 110 may house a plurality of server computers and various other computers, network components, and devices. For example, data asset tracking computing platform 110 may include a plurality of server nodes that are made up of and/or otherwise include one or more servers and/or server blades, which may be monitored and/or controlled by data asset tracking computing platform 110 and/or one or more other computing devices included in computing environment 100. Each server and/or server blade included in the plurality of server nodes associated with data asset tracking computing platform 110 may include one or more processors, memories, communication interfaces, storage devices, and/or other components.

Enterprise server infrastructure 120 may include one or more computing devices and/or other computer components (e.g., processors, memories, communication interfaces). In addition, enterprise server infrastructure 120 may be configured to host, execute, and/or otherwise provide one or more enterprise applications. For example, enterprise server infrastructure 120 may be configured to host, execute, and/or otherwise provide an enterprise mobile application for user devices, and/or other programs associated with an enterprise server. In some instances, enterprise server infrastructure 120 may be configured to provide various enterprise and/or back-office computing functions for an enterprise organization, such as a financial institution. For example, enterprise server infrastructure 120 may include various servers and/or databases that store and/or otherwise maintain account information, such as financial account information including account balances, transaction history, account owner information, and/or other information. In addition, enterprise server infrastructure 120 may process and/or otherwise execute tasks on specific accounts based on commands and/or other information received from other computer systems included in computing environment 100. Additionally, or alternatively, enterprise server infrastructure 120 may receive instructions from the data asset tracking computing platform 110 and execute the instructions in a timely manner, e.g., for the tracking of asset data.

Enterprise server infrastructure 120 may include one or more computing devices and/or other computer components (e.g., processors, memories, communication interfaces), and may be configured to perform one or more functions related to event processing (e.g., processing of a trade, or other events). For example, the enterprise server infrastructure 120 may include an order management system, an execution system, an allocation system, a usage system, a clearing system, a confirmation system, a payment system, a request for quote system, a settlement system, a position keeping system, and/or other systems involved in event processing.

Enterprise server infrastructure 120 may include multiple server computers that are owned, operated, maintained, and/or otherwise used by an organization, such as an enterprise organization associated with the data asset tracking computing platform 110. For example, enterprise server infrastructure 120 may include one or more server computers that store and/or otherwise maintain enterprise applications (which may, e.g., be executed by and/or provided to one or more computing devices associated with enterprise users) and/or enterprise information (which may, e.g., be accessed and/or used by the enterprise applications and/or by the one or more computing devices associated the with enterprise users).

For example, enterprise server infrastructure 120 may include one or more computer systems that are configured to provide one or more portal interfaces to one or more client devices and/or configured to authenticate one or more client devices and/or users of such devices to such portal interfaces. For example, enterprise server infrastructure 120 may include a computer system configured to provide a customer portal, such as an online banking portal, to one or more customers of an organization, such as a financial institution, who may use one or more computing devices to access the portal and/or who may be authenticated to one or more portal user accounts by the computer system using various authentication techniques. In some instances, in addition to being configured to provide an online banking portal associated with a financial institution to one or more customers of the financial institution and/or their associated computing devices, the computer system (which may, e.g., be included in enterprise server infrastructure 120) also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Additionally or alternatively, enterprise server infrastructure 120 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating one or more computer systems in computing environment 100), to connect one or more customers of the organization with one or more customer service representatives of the organization via one or more telephone support sessions, chat support sessions, and/or other client support sessions.

Enterprise data source 130 may include one or more computing devices and/or other computer components (e.g., processors, memories, communication interfaces). In addition, and as illustrated in greater detail below, enterprise data source 130 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which enterprise data source 130 may be deployed.

In some instances, enterprise data source 130 may include one or more computing devices (servers, server blades, or the like) that may be configured to store event data (e.g., a plurality of historical transactions of a particular type and/or various specific types). For example, the enterprise data source 130 may be configured to store transaction data such as information identifying details of various loan transactions, credit card transactions, cryptocurrency transactions, mutual fund transactions, exchange traded fund (ETF) transactions, equity trades, or the like, and may provide information about the stored transaction data upon request (e.g., to the data asset tracking computing platform 110). In some instances, the enterprise data source 130 may also be maintained by the enterprise organization maintaining the data asset tracking computing platform 110 and/or enterprise server infrastructure 120.

First user computing device 140 may include a laptop computer, desktop computer, mobile device, tablet, smartphone, or the like that may be used by an individual such as a client of an enterprise organization (e.g., a financial institution, or the like). For example, the first user computing device 140 may be used by one or more individuals to request or otherwise initiate processing of events (e.g., trades and/or other financial transactions). In some instances, first user computing device 140 may be configured to display one or more user interfaces.

Second user computing device 150 may include a laptop computer, desktop computer, mobile device, tablet, smartphone, or the like that may be used by an individual such as a client of an enterprise organization (e.g., a financial institution, or the like) and/or a regulatory agency. For example, the second user computing device 150 may be used by one or more individuals to request or otherwise initiate processing of events (e.g., trades and/or other financial transactions). In some instances, second user computing device 150 may be configured to display one or more user interfaces (e.g., event processing review and/or other interfaces).

Computing environment 100 also may include one or more networks, which may interconnect data asset tracking computing platform 110, enterprise server infrastructure, enterprise data source 130, first user computing device 140, and/or second user computing device 150. For example, computing environment 100 may include a network 160 (which may interconnect, e.g., data asset tracking computing platform 110, enterprise server infrastructure, enterprise data source 130, first user computing device 140, and/or second user computing device 150).

In one or more arrangements, data asset tracking computing platform 110, enterprise server infrastructure, enterprise data source 130, first user computing device 140, and/or second user computing device 150 may be any type of computing device capable of sending and/or receiving requests and processing the requests accordingly. For example, data asset tracking computing platform 110, enterprise server infrastructure, enterprise data source 130, first user computing device 140, second user computing device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data asset tracking computing platform 110, enterprise server infrastructure, enterprise data source 130, first user computing device 140, and/or second user computing device 150, may, in some instances, be special-purpose computing devices configured to perform specific functions.

In some arrangements, data asset tracking computing platform 110, enterprise server infrastructure, enterprise data source 130, first user computing device 140, and/or second user computing device 150 may be owned and/or operated by an enterprise organization, and/or deployed by enterprise centers that are owned and/or operated by the enterprise organization. As illustrated in greater detail below, some aspects of the disclosure may provide technical benefits that are not found in conventional systems, because data asset tracking computing platform 110 is able to access confidential information, e.g., for the purpose of monitoring and logging account activity data over the lifecycle of an asset. Machine learning (e.g., by data asset tracking computing platform 110) may be used to efficiently monitor assert activity information and track such activity with a hash value (e.g., that does not reveal confidential account information) over the lifecycle of an asset.

In one or more arrangements, enterprise server infrastructure, enterprise data source 130, first user computing device 140, and/or second user computing device 150 may be any type of computing device or combination of devices capable of performing the particular functions described herein. For example, enterprise server infrastructure, enterprise data source 130, first user computing device 140, and/or second user computing device 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise server infrastructure, enterprise data source 130, first user computing device 140, and/or second user computing device 150 may, in some instances, be special-purpose computing devices configured to perform specific functions.

As mentioned above, computing environment 100 also may include one or more networks, which may interconnect one or more of data asset tracking computing platform 110, enterprise server infrastructure, enterprise data source 130, first user computing device 140, and/or second user computing device 150. For example, computing environment 100 may include network 160. Network 160 may include one or more sub-networks (e.g., Local Area Networks (LANs), Wide Area Networks (WANs), or the like). In some examples, network 160 may be associated with a particular organization (e.g., a corporation, financial institution, educational institution, governmental institution, or the like) and may interconnect one or more computing devices associated with the organization.

For example, data asset tracking computing platform 110, enterprise server infrastructure, enterprise data source 130, first user computing device 140, and/or second user computing device 150, may be associated with an organization (e.g., a financial institution), and network 160 may be associated with and/or operated by the organization, and may include one or more networks (e.g., LANs, WANs, virtual private networks (VPNs), or the like) that interconnect data asset tracking computing platform 110, enterprise server infrastructure, enterprise data source 130, first user computing device 140, and/or second user computing device 150, and one or more other computing devices and/or computer systems that are used by, operated by, and/or otherwise associated with the organization.

In one or more arrangements, data asset tracking computing platform 110, enterprise server infrastructure, enterprise data source 130, first user computing device 140, and/or second user computing device 150 may be any type of computing device capable of receiving a user interface, receiving input via the user interface, and communicating the received input to one or more other computing devices. For example, data asset tracking computing platform 110, enterprise server infrastructure, enterprise data source 130, first user computing device 140, second user computing device 150, and/or the other systems included in computing environment 100 may, in some instances, include one or more processors, memories, communication interfaces, storage devices, and/or other components. As noted above, and as illustrated in greater detail below, any and/or all of data asset tracking computing platform 110, enterprise server infrastructure, enterprise data source 130, first user computing device 140, and/or second user computing device 150 may, in some instances, be special-purpose computing devices configured to perform specific functions.

Referring to FIG. 1B, data asset tracking computing platform 110 may include one or more processors 111, memory 112, and communication interface 113. A data bus may interconnect processor 111, memory 112, and communication interface 113. Communication interface 113 may be a network interface configured to support communication between data asset tracking computing platform 110 and one or more networks (e.g., network 160, or the like). Memory 112 may include one or more program modules having instructions that when executed by processor 111 cause data asset tracking computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of data asset tracking computing platform 110 and/or by different computing devices that may form and/or otherwise make up data asset tracking computing platform 110. For example, memory 112 may have, host, store, and/or include data asset track module 112a, data asset tracking database 112b, cryptographic hash function engine 112c, and machine learning engine 112d.

Data asset tracking module 112a may have instructions that direct and/or cause data asset tracking computing platform 110 to execute advanced techniques to provide one or more data asset monitoring and tracking functions, such as monitoring of a transaction activity pool, identifying asset activity in the transaction activity pool, identifying a hash value associated with an account activity, and appending the account activity to a related hash value record in an immutable log. Data asset tracking database 112b may store information used by data asset tracking module 112a and/or data asset tracking computing platform 110 in application of advanced techniques to provide and maintain the immutable log containing hash values and related account activities, and/or in performing other functions. Cryptographic hash function engine 112c may have instructions that direct and/or cause the data asset tracking computing platform 110 to compute one or more hash values using a one-way cryptographic hash function that takes as input specified user account information and returns a numeric or alpha numeric hash value. Machine learning engine 112d may have instructions that direct and/or cause the data asset tracking computing platform 110 to set, define, and/or iteratively refine optimization rules and/or other parameters used by the data asset tracking computing platform 110 and/or other systems in computing environment 100.

Figure 2A:
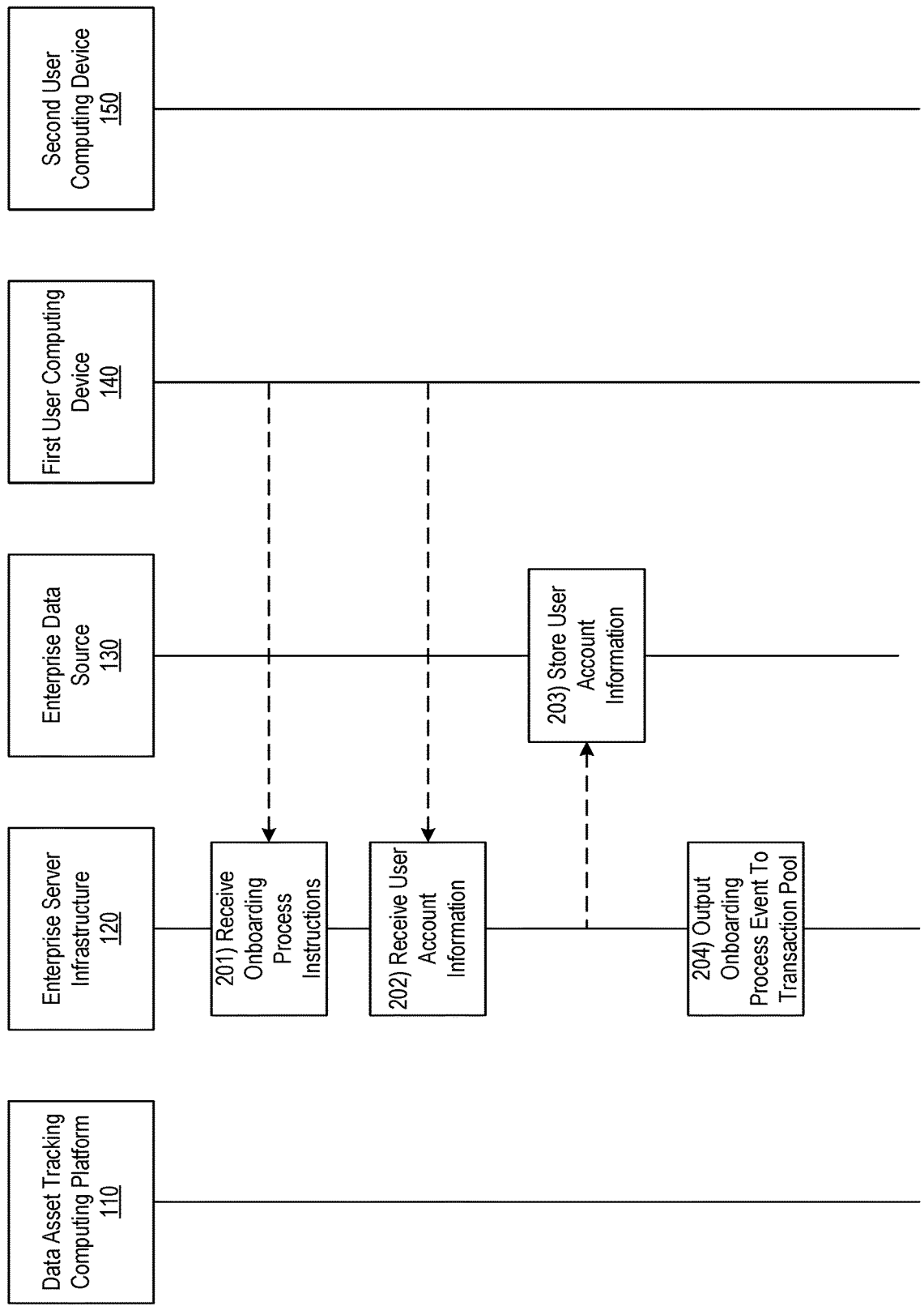
FIGS. 2A-2G depict an illustrative event sequence for implementing data tracking throughout an asset lifecycle in accordance with one or more example embodiments.

FIGS. 2A-2G depict an illustrative event sequence for implementing data tracking throughout an asset lifecycle in accordance with one or more example embodiments. Referring to FIG. 2A, at step 201, the enterprise server infrastructure 120 may receive instructions from a user computing device (e.g., the first user computing device 120) to perform on onboarding process. For example, the onboarding process may be part of an account setup initiated by a user to create a user account with an enterprise organization associated with the enterprise server infrastructure. In some instances, the enterprise server infrastructure 120 may receive the instructions to perform the onboarding process from an enterprise computing device, e.g., associated with an associate of the enterprise organization assisting a customer in setting up a user account with the enterprise organization. In some instances, the onboarding process may be automatically initiated, e.g., upon entry of a first component of user information, such as a name or email address. In some instances, a set of fields may be defined for the onboarding process, and enterprise server infrastructure 120 may create prompts for sending to the user computing device (e.g., the first user computing device 140) if not all fields have been completed at step 201, or in the process of receiving the instructions at step 201.

At step 202, the enterprise server infrastructure 120 may receive user account information from a user computing device, e.g., the first user computing device 140. For instance, the computing device that sends user account information at step 202 may be the same computing device from which the instructions to perform the onboarding process were sent at step 201. The user account information may include the set of fields defined for the onboarding process as described above. In some examples, the user account information of step 202 and the onboarding process instructions of step 201 may be received simultaneously. In some examples, onboarding process instructions may be initially received, causing the enterprise server infrastructure to transmit one or more prompts for user account information to the user computing device. In some examples, e.g., where a user is already an account holder with the enterprise organization, certain fields of the user account information may already be stored within the enterprise server infrastructure 120, the enterprise data source 130, and/or other computing devices associated with the enterprise organization.

At step 203, the enterprise server infrastructure 120 may store user account information to the enterprise data source 130, in connection with the setup of the user account. For example, the enterprise server infrastructure 120 may store the user account information to the enterprise data source 130 upon completion of the onboarding process and upon the creation of the user account. In some instances, the enterprise server infrastructure 120 may store the user account information to the enterprise data source 130 automatically upon receiving the user account information e.g., regardless of whether the onboarding process is ever completed or if all needed field of the user account information have been received. The user account information may be stored to the enterprise data source 130 in an encrypted format, as such information typically includes confidential user information, such as name, address, data of birth, social security number, and the like.

At step 204, the enterprise server infrastructure 120 may output the onboarding process activity to a transaction activity pool. The transaction activity pool may provide a list of descriptions of account activities within the enterprise organization. As will be described in further detail below, the data asset tracking computing platform 110 may monitor the transaction activity pool for carrying out various data asset tracking steps. The transaction activity pool may only be accessible to computing systems within the enterprise organization network, such as the data asset tracking computing platform 110. In some instances, the transaction activity pool may include sufficient information to describe an account and a type of account activity. The onboarding process activity may be automatically output to the transaction activity pool upon the initiation or the completion of the onboarding process. In some examples, the transaction activity pool may include one or more additional identifiers or descriptors used by the enterprise organization to identify, e.g., a type of user account, a type of activity, an account status, an activity timestamp, an activity location, and the like.

Figure 2B:
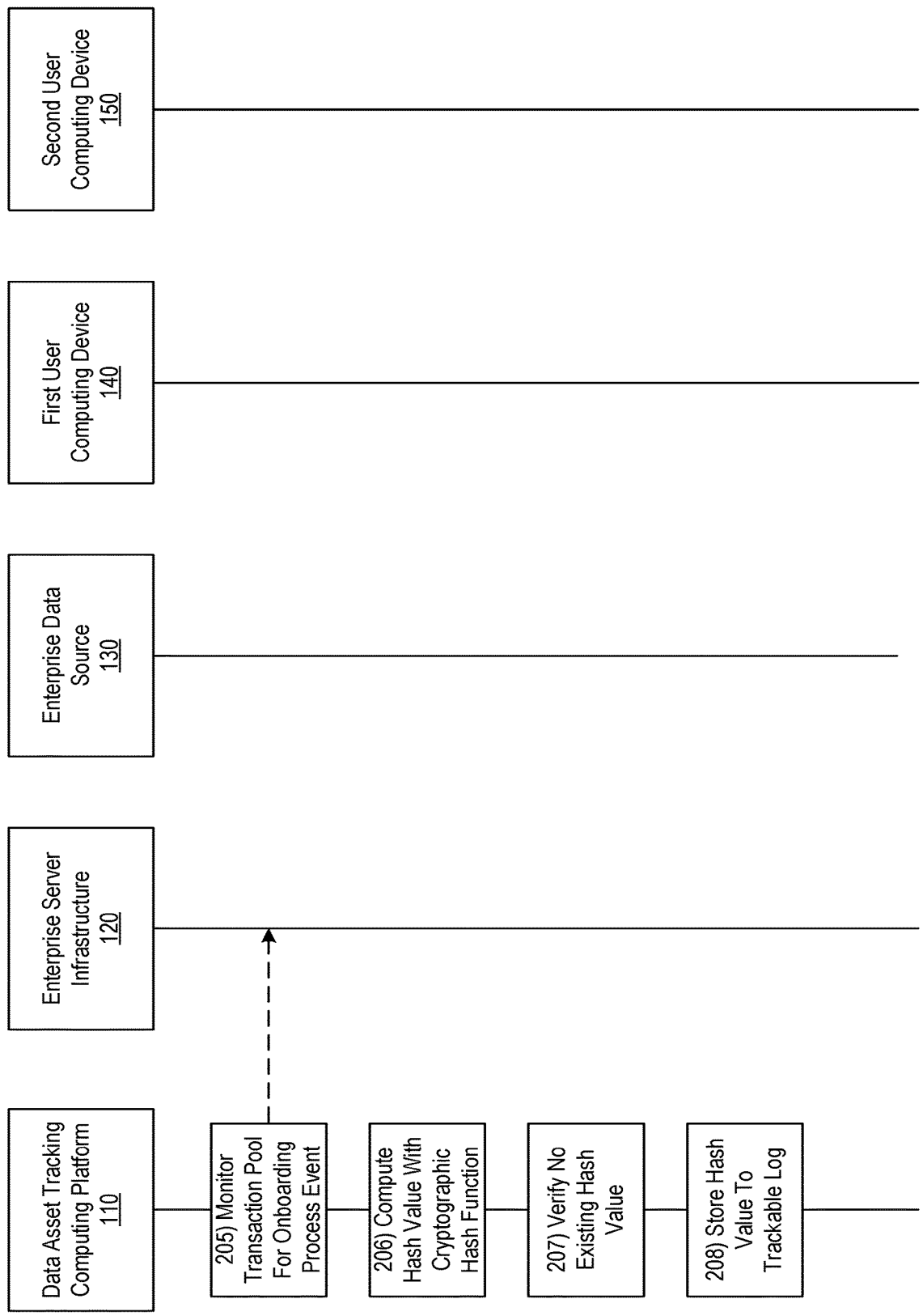

Now referring to FIG. 2B, at step 205, the data asset tracking computing platform 110 may monitor the transaction activity pool of the enterprise server infrastructure 120 and, based on such monitoring, may receive an indication of the onboarding process activity from the enterprise server infrastructure 120. For example, the data asset tracking computing platform 110 may monitor the transaction activity pool for certain types of account transactions. The data asset tracking computing platform 110 may automatically receive indication of such types of account transactions, e.g., an onboarding process activity, upon such types of account transactions being output to the transaction activity pool. In some instances, the data asset tracking computing platform 110 may receive the indication of the onboarding process activity based on monitoring the storage of new user account information at the enterprise data source 130. In these instances, the data asset tracking computing platform 110 may receive the indication of the onboarding process activity without monitoring the transaction activity pool. In some instances, the data asset tracking computing platform 110 may be configured to search the transaction activity pool for certain activity descriptors such that detection of such activity descriptors may automatically signify to the data asset tracking computing platform 110 the onboarding process activity.

At step 206, the data asset tracking computing platform 110 may compute a hash value (also referred to as a hash code, a message digest, or a digital fingerprint) using a one-way cryptographic hash function, e.g., via the cryptographic hash function engine 112c. The cryptographic hash function engine 112c may be configured to take an input, e.g., user account information, and return a fixed-size string on bytes, e.g., the hash value. The cryptographic hash function engine 112c may be configured to calculate a hash value for any given data using a one-way cryptographic hash function, such that it is extremely computationally difficult, if not impossible, to calculate a reverse hash function for computing the alphanumeric text used as input in computing the hash function. Further, the cryptographic hash function engine 112c may be configured such that it is extremely unlikely, if not impossible, for two different inputs to have the same hash. The cryptographic hash function engine 112c may thus take a string of any length as input and produce, for the hash value, a fixed length string which acts as a kind of signature for the input data provided. In this way, the original input cannot be computed based on the hash value. In this manner, the cryptographic hash function engine 112c may employ a cryptographic hash function that behaves much like a random function while still being deterministic and efficiently computable.

At step 207, the data asset tracking computing platform 110 may verify that there is no existing hash value that matches the hash value associated with the user account information of the onboarding process activity computed at step 206. The data asset tracking computing platform 110 may store a number of hash values, as well as related account activities descriptors in a database, such as data asset tracking database 112b. Accordingly, at step 206, the data asset tracking computing platform 110 may compute a hash value from the user account information using a cryptographic hash function and, at step 207, may then compare that hash value to one or more stored hash values in a database, such as the data asset tracking database 112b. The verification at step 207 may be performed to verify that the user account information associated with the onboarding process activity is indeed a new account holder. This step may also verify that the activity designated as an onboarding process activity relates to a new account, rather than simply changing an existing account. The verification at step 207 may further be performed to verify that the cryptographic hash function does not calculate the same hash value for two different inputs. Upon verifying that there is no existing hash value that matches the computed hash value at step 207, the data asset tracking computing platform 110 may proceed to step 208 treating the computed hash value as a new data entry. If the data asset tracking computing platform 110 determines that there is an existing hash value that matches the computed hash value at step 207, the data asset tracking computing platform 110 may perform one or more additional analyses to verify that the existing hash value is associated with the same user account. In some instances, if the data asset tracking computing platform 110 determines that there is an existing hash value that matches the computed hash value at step 207, the data asset tracking computing platform 110 may proceed to step 208 and may include one or more aspects of the existing hash value in the record for the computed hash value, as will be described in greater detail below.

At step 208, the data asset tracking computing platform 110 may store the computed hash value in a record in a trackable log. The account activity, e.g., the onboarding process activity, may also be stored in the record in the trackable log. For example, the data asset tracking computing platform 110 may store the computed hash value and/or the onboarding process activity in a portion (e.g., a cell, row, column, table, and/or other portion) of a database that forms the trackable log. For example, the trackable log may be stored in the data asset tracking database 112b. The record may include one or more descriptors relating to the onboarding process activity and/or any subsequent activities. Further, and to the extent that the record includes only the hash value and process activity descriptors, no confidential user data is retained in the trackable log. However, the trackable log may provide a comprehensive listing of all data instances relating to the user account, e.g., detailing where confidential user information may be stored. In some instances, the data asset tracking computing platform 110 may configure the stored record in the trackable log so that it may be used to query corresponding systems for additional data. For example, the data asset tracking computing platform 110 may identify, using the computed hash value, that the first user computing device 140 was involved in processing the onboarding process activity, and may query the first user computing device 140 for additional information related to processing the activity (e.g., the onboarding activity event). As will be discussed in greater detail below, activities which may be appended to the trackable log at step 218 may include onboarding, storage, distribution, processing, moving, printing, sanitation, alteration, removal, revocation, archival, and the like. In some instances, the trackable log for a given record may include a number of entries of user account activity, e.g., arranged in the record in a chronological order.

Figure 3:
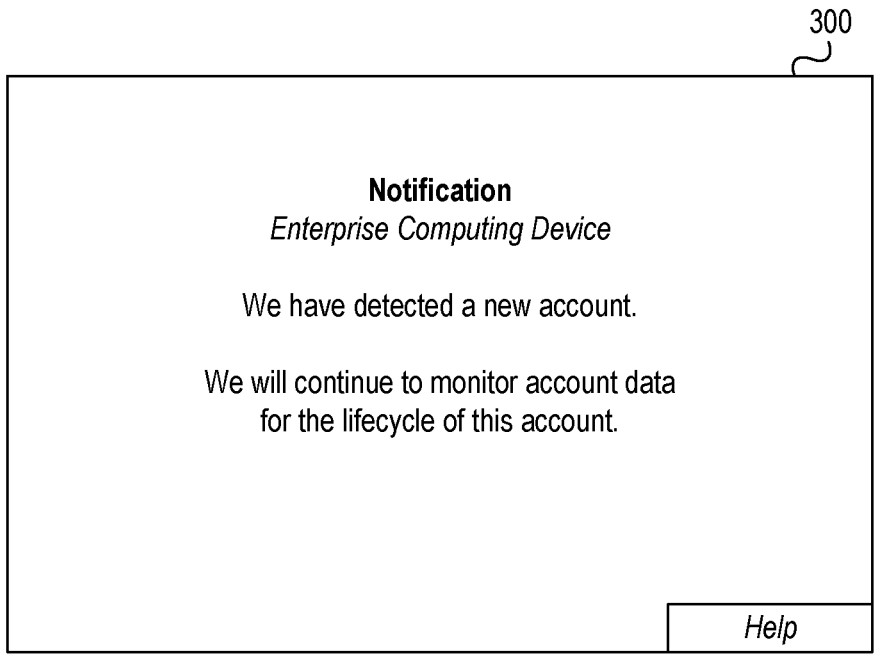
FIGS. 3-6 depict an illustrative graphical user interface for implementing data tracking throughout an asset lifecycle in accordance with one or more example embodiments.

In some instances, storing the computed hash value in a record of the trackable log at step 208 may include transmitting a notification to a computing device. For example, while storing the computed hash value, the data asset tracking computing platform 110 may generate and send to a computing device, such as an enterprise computing device of the enterprise server infrastructure 120 or the first user computing device 140 a graphical user interface similar to graphical user interface 300, which is depicted in FIG. 3. As seen in FIG. 3, graphical user interface 300 may include status information indicating that a new account has been detected as part of the onboarding process activity and indicating that the data asset tracking computing platform 110 will continue to monitor account activity for the new account resulting from the onboarding process activity. An interface similar to graphical user interface 300 may be presented at any time during the onboarding process, e.g., as part of steps 201-208, and/or following the completion of the onboarding process.

Figure 2C:
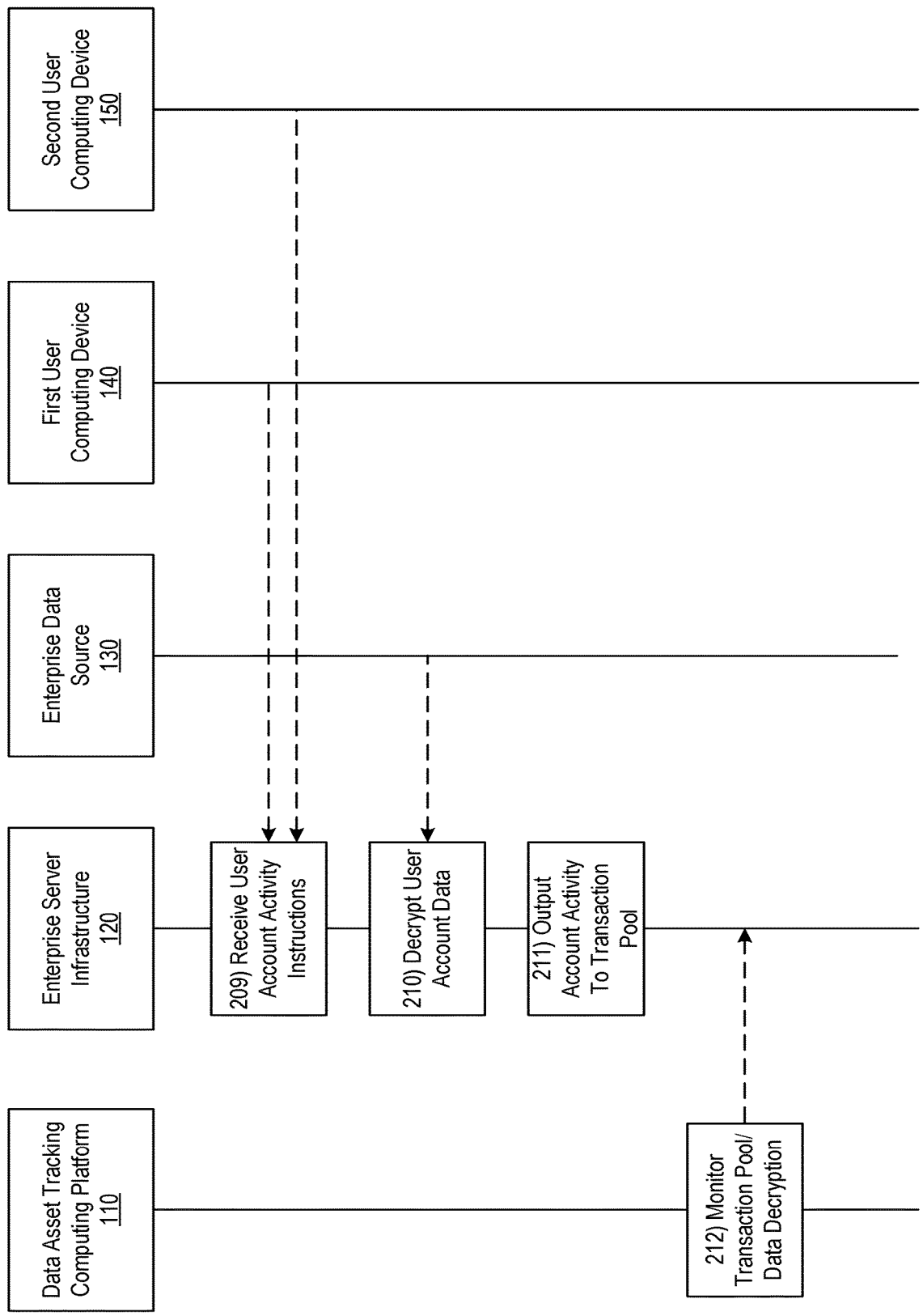

Referring to FIG. 2C, at step 209, the enterprise server infrastructure 120 may receive instructions to perform a user account activity from a user computing device, such as the first user computing device 140 or the second user computing device 150. For example, the instructions to perform a user account activity may include any number of activities typically performed with respect to user enterprise account, including but not limited to data being moved, sanitized, printed, masked, modified, and the like. In some instances, the instructions received at step 209 may be contingent on the completion of an authentication process at the user computing device to verify that the user is an authenticated user of the associated account. In some instances, the instructions received at step 209 may be contingent on verifying that the user account is an account tracked by the data asset track computing platform.

At step 210, the enterprise server infrastructure 120 may decrypt user account data from the enterprise data source 130. For example, the decryption of the user account data may be performed as part of carrying out the user account activity instructions received at step 209. Decryption of the user account data may be contingent on the completion of an authentication process at the user computing device to verify that the user is an authenticated user of the associated account.

At step 211, the enterprise server infrastructure 120 may output the user account activity to the transaction activity pool. For example, encryption of the user account data from the enterprise data source 130 may automatically output the associated account activity to the transaction activity pool. For example, if the user account activity was a transmission for a print application, the print application activity may be output to the transaction activity pool upon decrypting that data for the print application from the enterprise data source 130. The output in the transaction activity pool may include a descriptor of the user account activity and user account information. As discussed, the transaction activity pool may provide a list of descriptions of account activities within the enterprise organization. The transaction activity pool may only be accessible to computing systems within the enterprise organization network, such as the data asset tracking computing platform 110. In some instances, the transaction activity pool may include sufficient information to describe an account and a type of account activity. The user account activity may be automatically output to the transaction activity pool upon the initiation or the completion of the associated user account activity. In some examples, the transaction activity pool may include one or more additional identifiers or descriptors used by the enterprise organization to identify, e.g., a type of user account, a type of activity, an account status, an activity timestamp, an activity location, and the like.

At step 212, the data asset tracking computing platform 110 may monitor the transaction activity pool of the enterprise server infrastructure 120 and, based on such monitoring, may receive an indication of the user account activity from the enterprise server infrastructure 120. For example, the data asset tracking computing platform 110 may monitor the transaction activity pool for certain types of account transactions. The data asset tracking computing platform 110 may automatically receive indication of such types of account transactions, e.g., based on the decryption of user account data from the enterprise data source 130, upon such types of account transactions being output to the transaction activity pool. In some instances, the data asset tracking computing platform 110 may receive the indication of the user account activity based on monitoring the decryption of user account data at the enterprise data source 130. In these instances, the data asset tracking computing platform 110 may receive the indication of the data decryption activity without monitoring the transaction activity pool. In some instances, the data asset tracking computing platform 110 may be configured to search the transaction activity pool for certain activity descriptors such that detection of such activity descriptors may automatically signify to the data asset tracking computing platform 110 the user account activity.

Figure 2D:
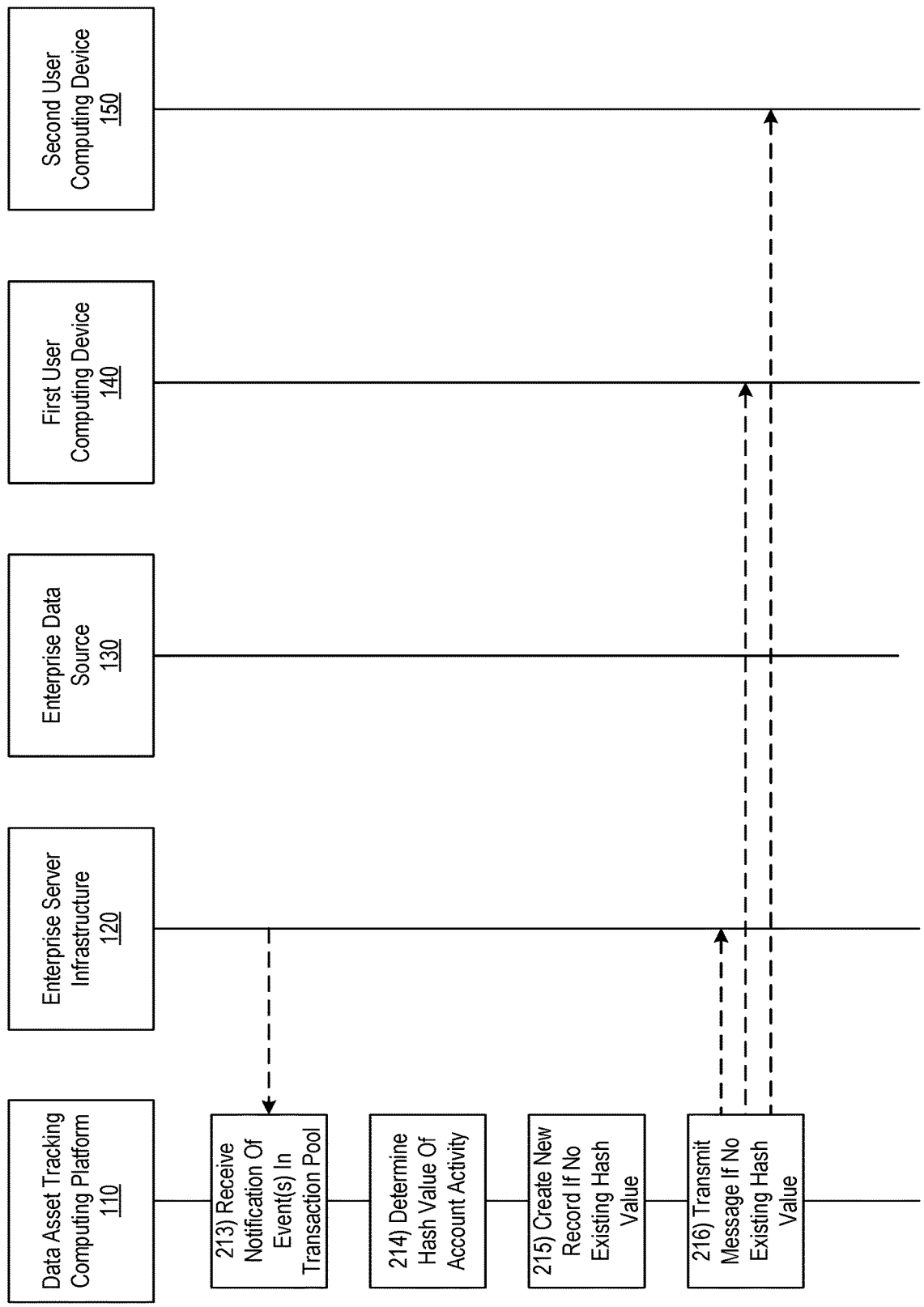

Now referring to FIG. 2D, at step 213, the data asset tracking computing platform 110 may, based on the monitoring of the transaction activity pool of the enterprise server infrastructure 120, receive a notification of a new event in the transaction activity pool. For example, the data asset tracking computing platform 110 may monitor the transaction activity pool for certain types of account transactions. In some instances, a new event in the transaction activity pool may automatically trigger the notification being sent to the data asset tracking computing platform 110 at step 213.

At step 214, the data asset tracking computing platform 110 may determine a hash value associated with the account activity. For example, the hash value may be computed with the one-way cryptographic hash function, e.g., using cryptographic hash function engine 112c, with user account information as the input of the cryptographic hash function. In some instances, the hash value may be computed based on information provided in the transaction activity pool. The hash value computed at step 214 may be computed using the same cryptographic hash function use to compute the hash value at step 206. The hash value computed at step 214 may be computing using the cryptographic hash function engine 112*c*, which may be configured to take an input, e.g., user account information, and return a fixed-size string on bytes, e.g., the hash value. The cryptographic hash function engine 112*c* may be configured to calculate a hash value for any given data using a one-way cryptographic hash function. The cryptographic hash function engine 112*c* may thus take a string of any length as input and produce, for the hash value, a fixed length string which acts as a kind of signature for the input data (e.g., user account information) provided.

At step 215, the hash value determined at step 214 may be compared to one or more hash values stored in the trackable log of the data asset tracking computing platform 110, and create a new record in the trackable log upon determining that the computed hash value does not match an existing hash value in the trackable log. For example, the data asset tracking computing platform 110 may query a database of hash values stored in the trackable log to identify a hash value that matches the hash value determined at step 214. If no existing hash value is found in the trackable log that matches the hash value computed at step 214, the data asset tracking computing platform 110 may create a new record in the trackable log linked to the computed hash value. If an existing hash value is found in the trackable log that matches the hash value computed at step 214, the data asset tracking computing platform 110 may proceed to step 217.

At step 216, the data asset tracking computing platform 110 may transmit a message to a computing device upon determining that the computed hash value does not match an existing hash value in the trackable log at step 215. In some instances, the message may be transmitted to an enterprise computing device of the enterprise system infrastructure 120 or to a user computing device, such as the first user computing device 140 or the second user computing device 150. For example, the data asset tracking computing platform 110 may generate and send to a computing device, such as an enterprise computing device of the enterprise server infrastructure 120 or the first user computing device 140 a graphical user interface similar to graphical user interface 300, which is depicted in FIG. 3. As seen in FIG. 3, graphical user interface 300 may include status information indicating that a new account has been detected as part of user account activity received and indicating that the data asset tracking computing platform 110 will continue to monitor account activity for that account. An interface similar to graphical user interface 300 may be presented at any time during the user account activity, e.g., as part of steps 209-216, and/or following the completion of the user account activity.

Figure 2E:
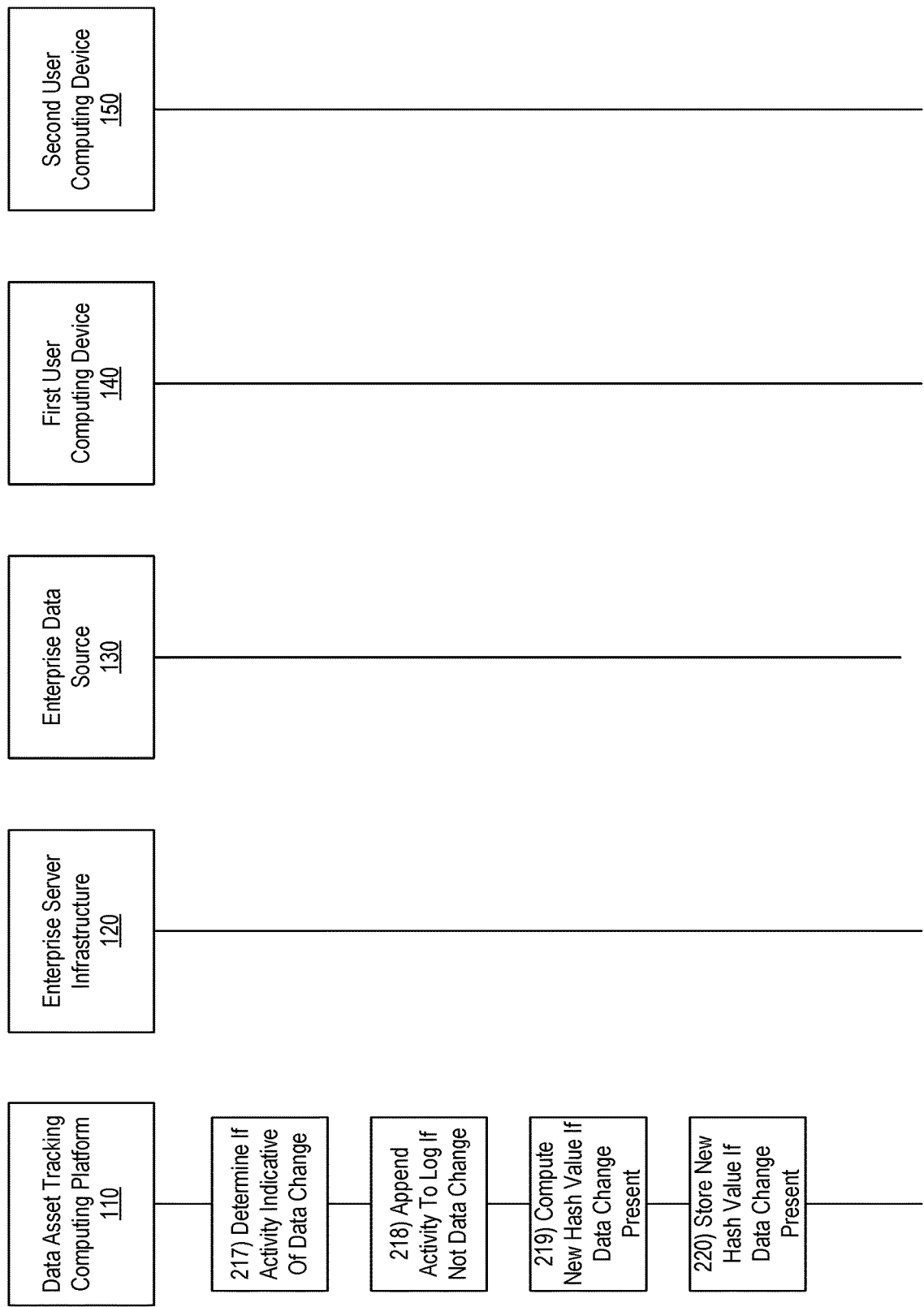

Referring to FIG. 2E, at step 217, the data asset tracking computing platform 110 may determine if the user account activity is indicative of a data change. For example, data indicative of a data change may include adding a new account to the user account profile. Determining if the user account activity is indicative of a data change may include analyzing one or more user account activity descriptors in the transaction activity pool to determine if such descriptors are indicative of a data change.

At step 218, if the data asset tracking computing platform 110 determines that the user account activity is not indicative of a data change, the data asset tracking computing platform 110 may append the user account activity to the record associated with a hash value that matches the computed hash value. For example, the data asset tracking computing platform 110 may append the user account activity and an associated time stamp to the record in the trackable log. Activities which may be appended to the trackable log at step 218 may include onboarding, storage, distribution, processing, moving, printing, sanitation, alteration, removal, revocation, archival, and the like. In some instances, the trackable log for a given record may include a number of entries of user account activity, e.g., arranged in the record in a chronological order.

At step 219, if the data asset tracking computing platform 110 determines that the user account activity is indicative of a data change, the data asset tracking computing platform 110 may create a new record for the trackable log, with the newly computed hash value. At step 220, where the data asset tracking computing platform 110 has determined that the user account activity is indicative of a data change, the data asset tracking computing platform 110 may store the computed hash value and the user account activity to the new record in the trackable log. For example, the data asset tracking computing platform 110 may include the user account activity and an associated time stamp to the new record in the trackable log. The new record may also include activities from the previous record, e.g., prior to the data change. In some instances, the trackable log for the record may include a number of entries of user account activity, e.g., arranged in the record in a chronological order. In some instances, the new record may have a computed hash value different than a hash value associated with a related user account, e.g., where a user with a first user account opens a second (new) user account. In these instances, a given record for a particular hash value may include a number of other (e.g., previous) hash values related to the user account and a number of user account activities associates with those hash values.

Figure 2F:
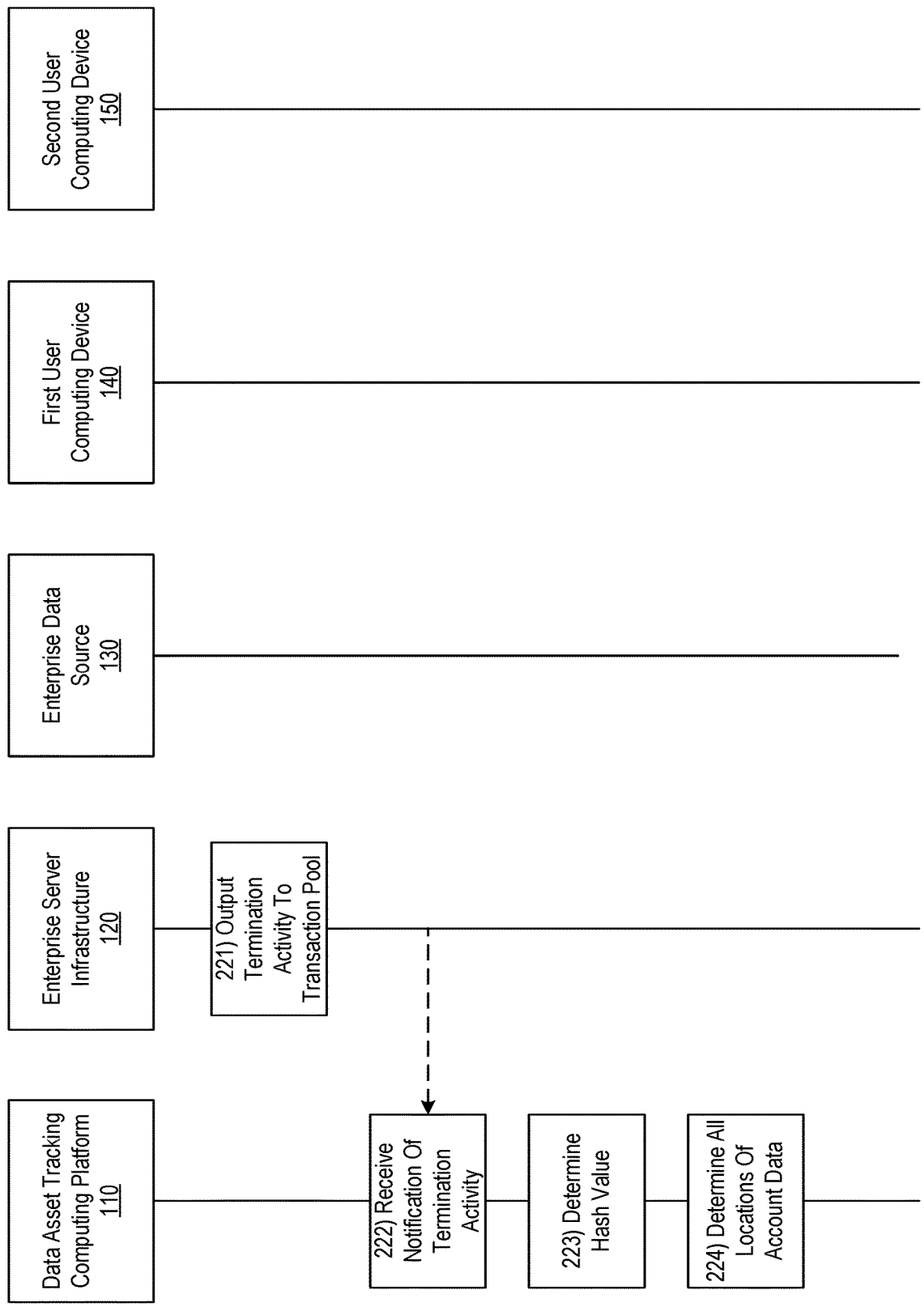

Referring to FIG. 2F, at step 221, the enterprise server infrastructure 120 may output an account termination activity to the transaction activity pool. For example, the account termination activity may automatically output to the transaction activity pool upon receiving instructions to terminate a user account from an enterprise computing device of the enterprise server infrastructure 120 or a user computing device, such as the first user computing device 140 or the second user computing device 150. For example, the account termination activity may be output to the transaction activity pool upon decrypting that data related to terminating a user account from the enterprise data source 130. The output in the transaction activity pool may include a descriptor of the account termination activity and user account information. As discussed, the transaction activity pool may only be accessible to computing systems within the enterprise organization network, such as the data asset tracking computing platform 110. In some instances, the transaction activity pool may include sufficient information to describe an account and any further details related to the account termination activity. The account termination activity may be automatically output to the transaction activity pool upon the initiation or the completion of the associated account termination activity. In some examples, the transaction activity pool may include one or more additional identifiers or descriptors used by the enterprise organization to identify, e.g., a type of user account, a type of account termination activity, an account status, an activity timestamp, an activity location, and the like.

At step 222, the data asset tracking computing platform 110 may, based on monitoring of transaction activity pool of the enterprise server infrastructure 120, receive a notification of an account termination event in the transaction activity pool. In some instances, the data asset tracking computing platform 110 may monitor the transaction activity pool of the enterprise server infrastructure 120 and, based on such monitoring, may receive an indication of the account termination activity from the enterprise server infrastructure 120. For example, the data asset tracking computing platform 110 may monitor the transaction activity pool for certain types of account transactions, such as account terminations. In some instances, an account termination event in the transaction activity pool may automatically trigger the notification being sent to the data asset tracking computing platform 110 at step 222. The data asset tracking computing platform 110 may automatically receive indication of such types of account termination events, e.g., based on the decryption of user account data from the enterprise data source 130 in connection with terminating an account, and/or upon such types of account termination event being output to the transaction activity pool. In some instances, the data asset tracking computing platform 110 may receive the indication of the account termination activity based on monitoring the decryption of user account data at the enterprise data source 130. In these instances, the data asset tracking computing platform 110 may receive the indication of the data decryption activity without monitoring the transaction activity pool. In some instances, the data asset tracking computing platform 110 may be configured to search the transaction activity pool for certain activity descriptors such that detection of such activity descriptors may automatically signify to the data asset tracking computing platform 110 the account termination activity.

At step 223, the data asset tracking computing platform 110 may determine a hash value associated with the account termination activity. For example, the hash value may be computed with the one-way cryptographic hash function, e.g., using cryptographic hash function engine 112c, with user account information as the input of the cryptographic hash function. In some instances, the hash value may be computed based on information provided in the transaction activity pool. The hash value computed at step 223 may be computed using the same cryptographic hash function use to compute the hash value at step 206. The hash value computed at step 223 may be computing using the cryptographic hash function engine 112c, which may be configured to take an input, e.g., user account information, and return a fixed-size string on bytes, e.g., the hash value. The cryptographic hash function engine 112c may be configured to calculate a hash value for any given data using a one-way cryptographic hash function. The cryptographic hash function engine 112c may thus take a string of any length as input and produce, for the hash value, a fixed length string which acts as a kind of signature for the input data (e.g., user account information) provided. Upon computing the hash value associated with the account termination activity, the data asset tracking computing platform 110 may compare the computed hash value to one or more hash values stored in the trackable log. For example, the data asset tracking computing platform 110 may query a database of hash values stored in the trackable log to identify a hash value that matches the hash value computed at step 223. Upon identifying a hash value in the trackable log that matches the hash value computed at step 223, the data asset tracking computing platform 110 may proceed to step 224.

At step 224, the data asset tracking computing platform 110 may determine all user account data instances associated with the account being closed. For example, based on identifying a record in the trackable log associated with the computed hash value, the data asset tracking computing platform 110 may query entries in the record to determine instances or locations of account data across the enterprise server infrastructure 120. In some instances, data asset tracking computing platform 110 may determine a number of location of user account data in the enterprise server infrastructure 120 and/or the enterprise data source 130. The record in the trackable log may provide a thorough and accurate list of all locations or instances of user account data over the lifecycle of the account, such that the data asset tracking computing platform 110 is able to reliably determine all user account data instances associated with the account being terminated at step 224.

Figure 2G:
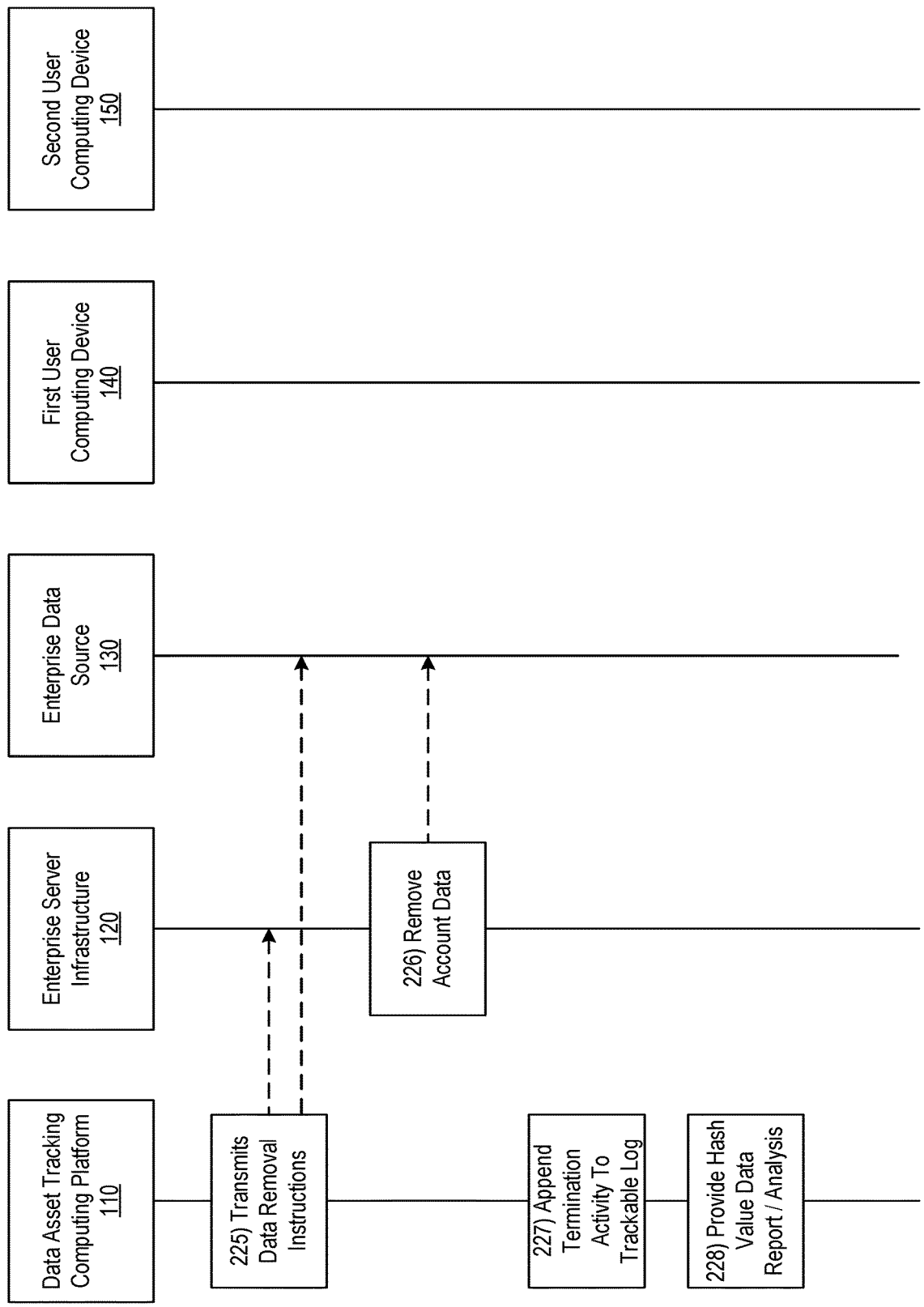

Now referring to FIG. 2G, at step 225, the data asset tracking computing platform 110 may transmit instructions to the enterprise server infrastructure 120 and/or the enterprise data source 130 regarding the account termination activity and locations of account information in the enterprise server infrastructure 120 and/or the enterprise data source 130. For example, the instructions transmitted at step 225 may be based on the information in the record from the trackable log associated with the hash value. The instructions may provide a listing of all locations or instances of data associated with the account to be terminated across the enterprise organization.

Figure 4:
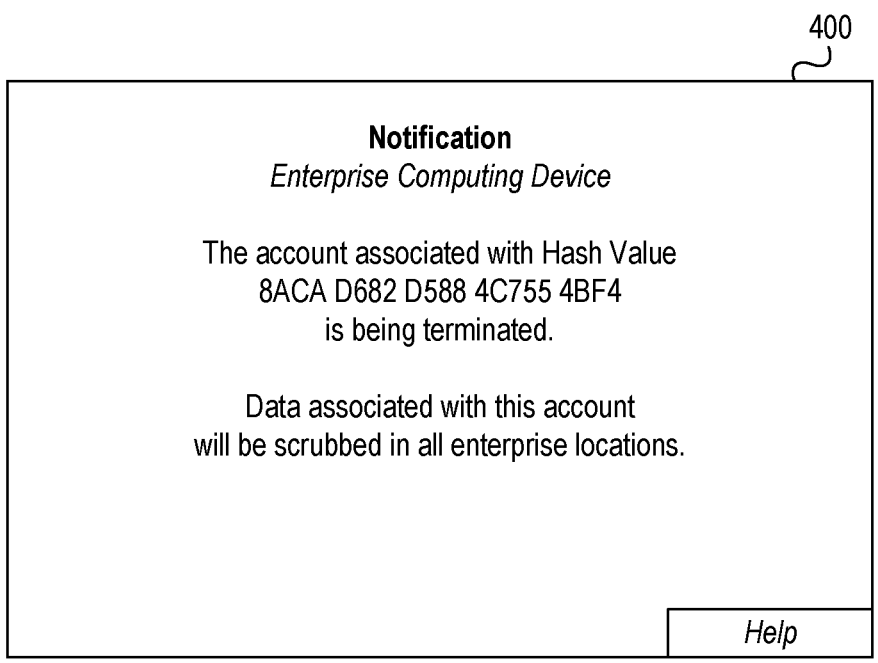

In some instances, the instructions transmitted at step 225 may cause the display of an interface at on an enterprise computing device with information related to the account to be terminated such as graphical user interface 400, which is depicted in FIG. 4. As seen in FIG. 4, graphical user interface 400 may include one or more user interface elements enabling a user of an enterprise computing device, e.g., a device of the enterprise server infrastructure 120, to display information associated with the account termination activity, such as the associated hash value and an indication that the account associated with that hash value is being terminated, and/or as indication that the data associated with the account will be scrubbed in all locations across the enterprise organization. In some examples, user account information may also be provided in the graphical user interface 400, e.g., where the enterprise computing device is authorized to view such information. In some examples, the graphical user interface 400 may include one or more interface elements to allow the user of the enterprise computing device to view the one or more instance of account data storage in the enterprise location.

At step 226, the enterprise server infrastructure 120 and/or the enterprise data source 130 may proceed with deleting or scrubbing all instances of user account data across the enterprise organization in accordance with the instruction received at step 225. In some instances, other conditions may initiate the removal or scrubbing of all instances of user account data across the enterprise organization. For example, the data asset tracking computing platform 110 may receive instructions from an administrator computing device associated with the enterprise server infrastructure 120, where the instructions specify the removal of data for compliance with regulatory requirements. As another example, the data asset tracking computing platform 110 may scrub account data upon the occurrence of certain events by the enterprise organization, such as the transfer of an account to another account.

At step 227, the data asset tracking computing platform 110 may append the account termination activity to the record associated with the hash value. For example, the data asset tracking computing platform 110 may add the account termination activity to all records relating to the hash value, where more than one record exists relating to the hash value. In some instances, the data asset tracking computing platform 110 may copy the record associated with the hash value of the account termination activity to an archival database that stores one or more records containing hash values and related activities for accounts that have been terminated. As described herein, although all instances of data relating to a particular account may be scrubbed across the enterprise organization, the record associated with the account in the immutable log may be retained. Thus, regardless of account status and regardless of status of account data across the enterprise organization, the immutable log may continue to retain a record associated with the account.

At step 228, the data asset tracking computing platform 110 provide one or more reports or analyses associated with tracked hash value data in the trackable log. For example, the data asset tracking computing platform 110 may receive a user input requesting access to asset lifecycle information corresponding to one or more user accounts. The data asset tracking computing platform 110 may receive a user input from a client, enterprise administrator, compliance monitoring officer, and/or other individuals requesting access to asset lifecycle data. As part of step 228, the data asset tracking computing platform 110 may receive a request for asset lifecycle information corresponding to one or more user account. For example, the data asset tracking computing platform 110 may receive the request for asset lifecycle information from an enterprise computing device associated with the enterprise server infrastructure 120 or from a user computing device, such as the first user computing device 140 or the second user computing device.

At step 228, the data asset tracking computing platform 110 may identify, based on instructions received, one or more hash values and related account activity information for the one or more reports or analyses. For example, the data asset tracking computing platform 110 may access the portion of the trackable log that corresponds to the one or more user accounts, and may identify, using the record stored in that portion of the trackable log, which systems were involved in the related account activities in the record. For example, the data asset tracking computing platform 110 may identify one or more enterprise systems that were involved in account activities for one or more user account over the lifecycle of a particular asset. Upon identifying the portion of the trackable log, the data asset tracking computing platform 110 may compile the portion as relevant and/or prepare additional reports based on the portion of the trackable log.

As part of step 228, the data asset tracking computing platform 110 may generate an asset lifecycle interface associated with tracked hash value data in the trackable log. In some instances, in generating the asset lifecycle interface, the data asset tracking computing platform 110 may generate and host an application programming interface (API) repository that includes a set of APIs that may provide details on relationships between one or more records in the trackable log. For example, the data asset tracking computing platform 110 may host APIs that may provide corresponding account activity identifiers when provided with account type identifiers or account activity type identifies. Accordingly, by implementing this API repository, the data asset tracking computing platform 110 may relate information (e.g., related to a transaction type) from multiple different records to a common event. In some instances, this may be advantageous for internal analytical needs and/or regulatory reporting.

Additionally or alternatively, in generating the asset lifecycle interface, the data asset tracking computing platform 110 may generate a web based user interface that may be used for investigating and/or researching previously one or more record of the trackable log (e.g., based on specified transaction activities) to query data based on an account activity, account type, transaction identifier, product details, client details, and/or other information. By generating such an interface, the data asset tracking computing platform 110 may provide a full detailed view of end to end processing of an asset lifecycle.

In some instances, the data asset tracking computing platform 110 may generate one or more commands directing an enterprise computing device of the enterprise server infrastructure 120 or a user computing device, such as the first user computing device 140 or the second user computing device 150 to display the asset lifecycle interface. The data asset tracking computing platform 110 may send the asset lifecycle interface and the one or more commands directing the enterprise computing device or user computing device to display the asset lifecycle interface via the communication interface 113.

The enterprise computing device or user computing device may receive the asset lifecycle interface and the one or more commands directing the computing device to display the asset lifecycle interface. For example, enterprise computing device or user computing device may receive the asset lifecycle interface and the one or more commands directing the computing device to display the asset lifecycle interface responsive the enterprise computing device or user computing device sending instructions to the data asset tracking computing platform 110 for creation of the asset lifecycle interface.

Figure 5:
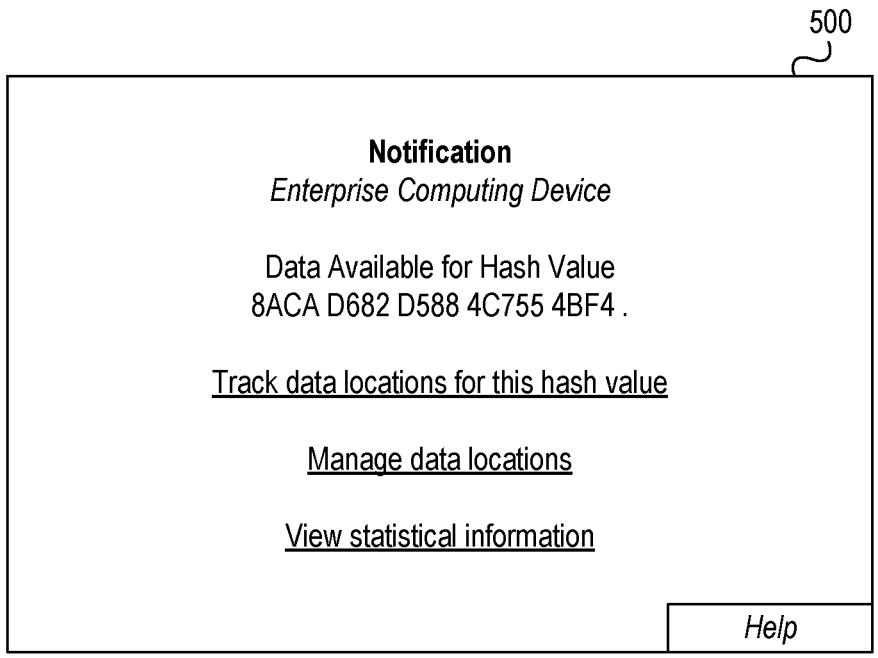
Figure 6:
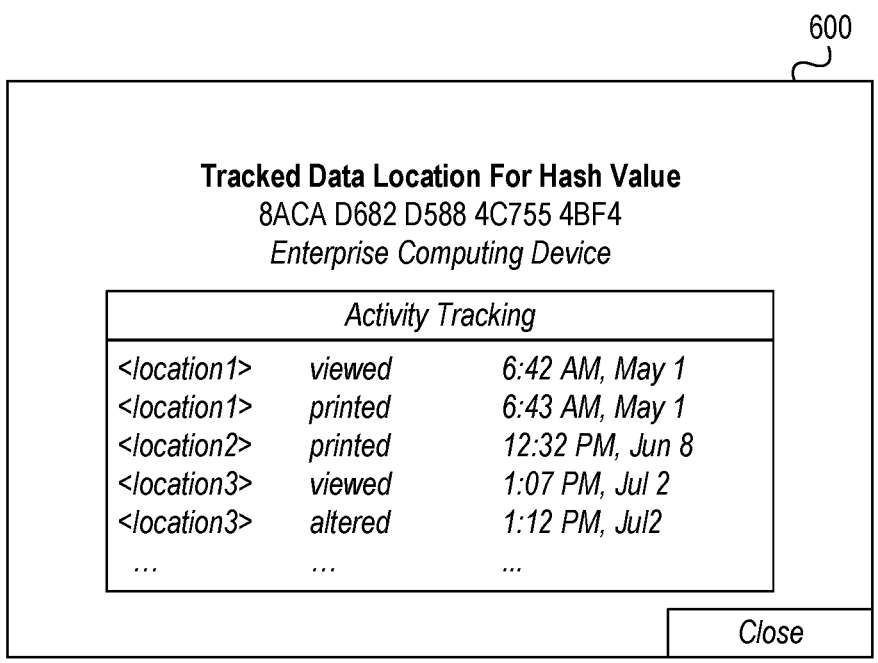

Based on or in response to the one or more commands directing enterprise computing device or user computing device to display the asset lifecycle interface, the computing device may display the asset lifecycle interface. For example, in displaying the asset lifecycle interface, the enterprise computing device may display a graphical user interface similar to graphical user interface 500, which is shown in FIG. 5. For example, the enterprise computing device may display a list of one or more hash values or account identifiers involved in processing the particular instructions, and may include links to access further information from each of the systems (e.g., to track data locations for the one or more hash values or account identifiers, to manage the data locations and/or to view statistical information, analyses, or reports). Upon selecting one or more of the links, the enterprise computing device may provide one or more additional interface related to the selected link. For example, in displaying tracked data locations for one or more hash values or account identifiers, the enterprise computing device may display a graphical user interface similar to graphical user interface 600, which is shown in FIG. 6. As shown in the graphical user interface 600 of FIG. 6, the enterprise computing device may provide a list of account activities and information related to such activities, such as an activity location, and activity descriptor, and activity timestamp, and the like. In some examples, the activities may be sorted and displayed in a chronological order based on a timestamp of the associated account activity.

Although a single data asset tracking computing platform 110 is described herein, any number of data asset computing platforms may be implemented using one or more of the methods described herein without departing from the scope of the disclosure. Furthermore, although the asset lifecycle interface is described with regard to display at an enterprise computing device associated with the enterprise server infrastructure 120, the asset lifecycle interface may, in some instances, be displayed at a user device, such as the first user computing device 140 or the second user computing device 150, without departing from the scope of the disclosure.

Figure 7:
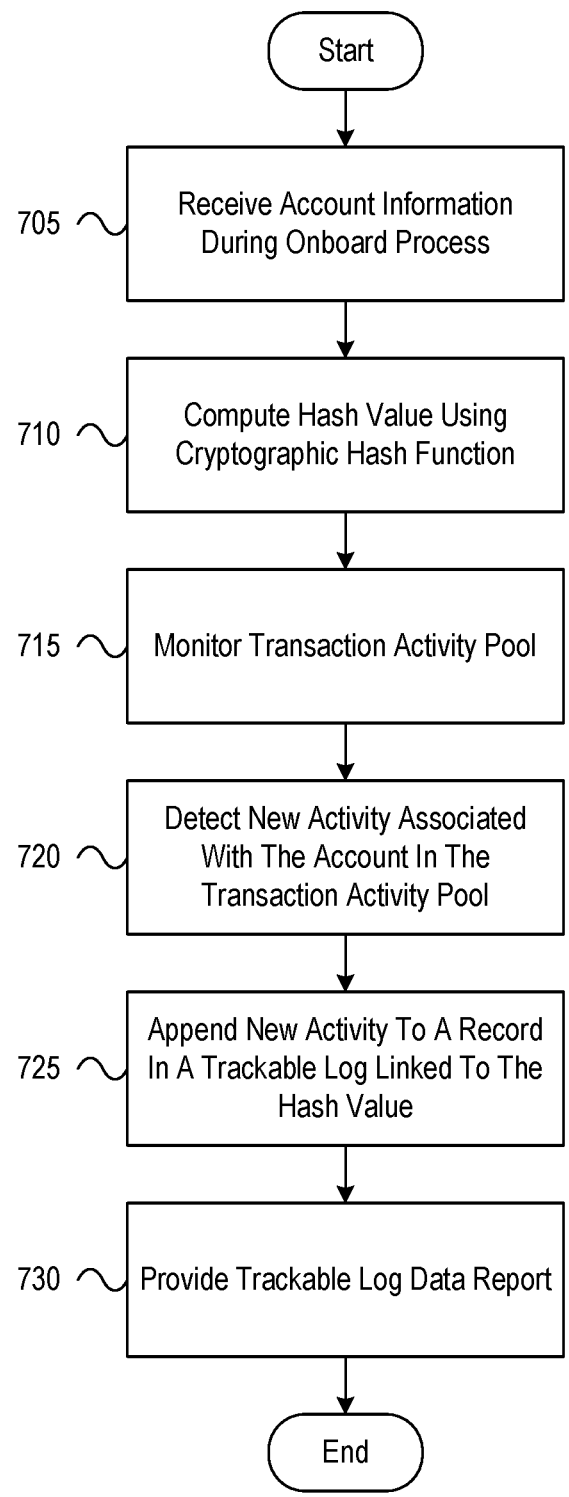
FIG. 7 depicts an illustrative method for implementing data tracking throughout an asset lifecycle in accordance with one or more example embodiments.

FIG. 7 depicts an illustrative method for implementing data tracking throughout an asset lifecycle in accordance with one or more example embodiments. Referring to FIG. 7, at step 705, a computing platform having at least one processor, a communication interface, and memory may receive user account information as part of an onboarding process. At step 710, the computing platform may computing a hash values based on user account information using a cryptographic hash function, and may store the computed hash value to a record in a trackable log. The hash value may provide a trackable, immutable code corresponding to the user account. At step 715, the computing platform may monitor a transaction activity pool for additional user account activity, e.g., subsequent to the onboarding process activity. At step 720, the computing platform may, based on monitoring the transaction activity pool, detect a new activity associated with the user account. At step 725, the computing platform may append the new activity to the record in the trackable log linked to the hash value. The computing platform may, in some instances, repeat steps 715 through 725 over the lifecycle of the user account.

At step 730, the computing platform may provide a trackable log data report based on information compiled in the trackable log. For example, in providing the trackable log data report, the computing platform may generate an asset lifecycle interface, based on the activity data compiled in the trackable log, and may send the asset lifecycle interface to an enterprise computing device for display. In providing the report at step 730, the computing platform may identify one or more record corresponding to a selected group of hash values or user accounts. In some instances, the report provided at step 730 may be provided based on receiving a request from an enterprise computing device and/or one or more related parameter associated with the requested report.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      receive, via the communication interface, user account information as part of an onboarding process in which a first user account is created;
      compute, using a cryptographic hash function, a first hash value associated with the first user account, wherein the first hash value provides a trackable, immutable code corresponding to the first user account;
      create a record in a trackable log linked to the first hash value;
      search, using a first activity descriptor, a transaction activity pool to locate a new activity, wherein the transaction activity pool comprises a plurality of activities that each comprise an activity descriptor and user account information, and wherein the new activity comprises first user account information and an activity descriptor matching the first activity descriptor;
      determine that the first user account information is associated with the first user account;

upon determining that the first user account information is associated with the first user account, append the new activity to the record in the trackable log linked to the first hash value;

monitor the transaction activity pool for additional user account activity associated with the first user account;

based on monitoring the transaction activity pool, append additional user account activity to the record in the trackable log linked to the first hash value;

receive, via the communication interface, a notification as part of an account termination process in which the first user account is terminated;

determine one or more computing locations of account data linked to the first user account, wherein the one or more computing locations are determined based on identifying all instances in the trackable log linked to the first user account and associated computing locations for each instance; and transmit instructions to the one or more computing locations to scrub account data associated with to the first user account.

2. The computing platform of claim 1, wherein the memory stores additional computer-readable instructions that, when executed by the at least one processor, cause the computing platform to:

receive a request to access one or more records in the trackable log;

generate an asset lifecycle interface and one or more commands directing an enterprise computing device to display the asset lifecycle interface; and send, to the enterprise computing device, the asset lifecycle interface and the one or more commands directing the enterprise computing device to display the asset lifecycle interface.

3. The computing platform of claim 2, wherein receiving the request to access one or more records in the trackable log includes receiving a request, from the enterprise computing device to access one or more user accounts, and identifying one or more hash values corresponding to the one or more user accounts.

4. The computing platform of claim 1, wherein receiving user account information as part of the onboarding process includes:

monitoring the transaction activity pool; and detecting an indication of the onboarding process in the transaction activity pool.

5. The computing platform of claim 1, wherein computing the first hash value includes verifying that there is no existing hash value matching the first hash value.

6. The computing platform of claim 5, wherein the memory stores additional computer-readable instructions that, when executed by the at least one processor, cause the computing platform to:

upon determining that there is an existing hash value matching the first hash value, append an onboard activity data entry to the record in the trackable log linked to the existing hash value.

7. The computing platform of claim 1, wherein computing the first hash value includes storing the first hash value and an onboard activity data entry to the record in the trackable log.

8. The computing platform of claim 1, wherein monitoring the transaction activity pool includes receiving a notification of a user account activity upon a user computing device transmitting instructions to an enterprise computing device to perform the user account activity.

9. The computing platform of claim 1, wherein monitoring the transaction activity pool includes receiving an indication that an enterprise computing device has decrypted enterprise data corresponding to the first user account.

10. The computing platform of claim 1, wherein detecting the new activity associated with the first user account in the transaction activity pool includes:

computing one or more hash values from account information associated with one or more events in the transaction activity pool; and comparing the one or more hash values to the first hash value, wherein the new activity is appended to the record in the trackable log linked to the first hash value upon determining a match between the one of the one or more hash values and the first hash value.

11. The computing platform of claim 10, wherein the memory stores additional computer-readable instructions that, when executed by the at least one processor, cause the computing platform to:

compare one of the one or more hash values to one or more stored hash values in the trackable log; and upon determining that there is no match between the one of the one or more hash values and the one or more stored hash values, add a new record in the trackable log, wherein the new record includes the one of the one or more hash values.

12. The computing platform of claim 1, wherein the memory stores additional computer-readable instructions that, when executed by the at least one processor, cause the computing platform to:

determine if the new activity is indicative of a data change, wherein appending the new activity to the record in the trackable log includes:

upon determining that the new activity is not indicative of a data change, appending the new activity to the record in the trackable log linked to the first hash value; and upon determining that the new activity is indicative of a data change, compute, using the cryptographic hash function, a second hash value associated with the new activity, and adding a second record in the trackable log, wherein the second record includes the second hash value, the first hash value, and the new activity.

13. The computing platform of claim 1, wherein receiving the notification as part of the account termination process includes monitoring the activity transaction pool for a notification of account termination activity.

14. The computing platform of claim 1, wherein the memory stores additional computer-readable instructions that, when executed by the at least one processor, cause the computing platform to:

append account termination activity to the record in the trackable log linked to the first hash value.

15. A method comprising:

at a computing platform comprising at least one processor, a communication interface, and memory:

receiving, via the communication interface, user account information as part of an onboarding process in which a first user account is created;

computing, using a cryptographic hash function, a first hash value associated with the first user account, wherein the first hash value provides a trackable, immutable code corresponding to the first user account;

creating a record in a trackable log linked to the first hash value;

searching, using a first activity descriptor, a transaction activity pool to locate a new activity, wherein the transaction activity pool comprises a plurality of activities that each comprise an activity descriptor and user account information, and wherein the new activity comprises first user account information and an activity descriptor matching the first activity descriptor;

determining that the first user account information is associated with the first user account;

upon determining that the first user account information is associated with the first user account, appending the new activity to the record in the trackable log linked to the first hash value;

monitoring the transaction activity pool for additional user account activity associated with the first user account;

based on monitoring the transaction activity pool, append additional user account activity to the record in the trackable log linked to the first hash value;

receiving, via the communication interface, a notification as part of an account termination process in which the first user account is terminated;

determining one or more computing locations of account data linked to the first user account, wherein the one or more computing locations are determined based on identifying all instances in the trackable log linked to the first user account and associated computing locations for each instance; and transmit instructions to the one or more computing locations to scrub account data associated with to the first user account.

16. The method of claim 15, further comprising:

receiving a request to access one or more records in the trackable log;

generating an asset lifecycle interface and one or more commands directing an enterprise computing device to display the asset lifecycle interface; and sending, to the enterprise computing device, the asset lifecycle interface and the one or more commands directing the enterprise computing device to display the asset lifecycle interface.

17. The method of claim 15, wherein detecting the new activity associated with the first user account in the transaction activity pool includes:

computing one or more hash values from account information associated with one or more events in the transaction activity pool; and comparing the one or more hash values to the first hash value, wherein the new activity is appended to the record in the trackable log linked to the first hash value upon determining a match between the one of the one or more hash values and the first hash value.

18. One or more non-transitory computer-readable media storing instructions that, when executed by a computing platform comprising at least one processor, a communication interface, and memory, cause the computing platform to:

receive, via the communication interface, user account information as part of an onboarding process in which a first user account is created;

compute, using a cryptographic hash function, a first hash value associated with the first user account, wherein the first hash value provides a trackable, immutable code corresponding to the first user account;

create a record in a trackable log linked to the first hash value;

search, using a first activity descriptor, a transaction activity pool to locate a new activity, wherein the transaction activity pool comprises a plurality of activities that each comprise an activity descriptor and user account information, and wherein the new activity comprises first user account information and an activity descriptor matching the first activity descriptor;

determine that the first user account information is associated with the first user account;

upon determining that the first user account information is associated with the first user account, append the new activity to the record in the trackable log linked to the first hash value;

monitoring the transaction activity pool for additional user account activity associated with the first user account;

based on monitoring the transaction activity pool, append additional user account activity to the record in the trackable log linked to the first hash value;

receive, via the communication interface, a notification as part of an account termination process in which the first user account is terminated;

determine one or more computing locations of account data linked to the first user account, wherein the one or more computing locations are determined based on identifying all instances in the trackable log linked to the first user account and associated computing locations for each instance; and transmit instructions to the one or more computing locations to scrub account data associated with to the first user account.

\* \* \* \* \*